United States Patent
Grainger et al.

(10) Patent No.: US 12,088,740 B2
(45) Date of Patent: Sep. 10, 2024

(54) SECURE SHARING OF CREDENTIAL INFORMATION

(71) Applicant: Apple Inc., Cupertino, CA (US)

(72) Inventors: Morgan J Grainger, Waterloo (CA); Russell Fenenga, Santa Clara, CA (US); Brandon K. Leventhal, San Francisco, CA (US); Sourabh Dugar, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/104,147

(22) Filed: Jan. 31, 2023

(65) Prior Publication Data

US 2023/0269098 A1    Aug. 24, 2023

Related U.S. Application Data

(63) Continuation of application No. 17/946,246, filed on Sep. 16, 2022, which is a continuation of application
(Continued)

(51) Int. Cl.
*G06F 15/16* (2006.01)
*H04L 9/32* (2006.01)
(Continued)

(52) U.S. Cl.
CPC ............ *H04L 9/3268* (2013.01); *H04L 51/04* (2013.01); *H04L 67/1097* (2013.01)

(58) Field of Classification Search
CPC ... H04L 9/3268; H04L 51/04; H04L 67/1097; G06Q 20/38215; G06Q 20/385;
(Continued)

(56) References Cited

U.S. PATENT DOCUMENTS

| 9,009,805 B1 | 4/2015 | Kirkby et al. |
| 11,606,217 B2 | 3/2023 | Grainger et al. |

(Continued)

FOREIGN PATENT DOCUMENTS

| WO | 2011/084117 A1 | 7/2011 |
| WO | 2015/183574 A1 | 3/2015 |
| WO | 2020/041594 A1 | 2/2020 |

OTHER PUBLICATIONS

"Notification of Grant," mailed Jul. 25, 2023 in Great Britain Patent Application No. GB2213693.1. 2 pages.
(Continued)

*Primary Examiner* — John B Walsh
(74) *Attorney, Agent, or Firm* — Kilpatrick Townsend Stockton LLP

(57) ABSTRACT

A first user device may be used to request provisioning of a secure credential on a second user device. A provisioning system may facilitate the provisioning in a manner that ensures security and privacy of the requesting parties. The provisioning requests may be made using an application on the first user device such as a third-party application or using a web application via a browser. The credential may be added to a digital wallet on the second user device. The credential may be useable by the second user device to perform one or more contactless transactions.

20 Claims, 19 Drawing Sheets

Related U.S. Application Data

No. 17/031,609, filed on Sep. 24, 2020, now Pat. No. 11,606,217.

(60) Provisional application No. 63/032,501, filed on May 29, 2020.

(51) Int. Cl.
*H04L 51/04* (2022.01)
*H04L 67/1097* (2022.01)

(58) Field of Classification Search
CPC .............. G06Q 20/38; G06Q 2220/00; G06Q 20/3227; H04W 12/069; H04W 12/033; G06F 21/33; G06F 21/35; G06F 21/335
See application file for complete search history.

(56) References Cited

U.S. PATENT DOCUMENTS

| | | | |
|---|---|---|---|
| 2004/0128535 | A1 | 7/2004 | Cheng |
| 2008/0065532 | A1 | 3/2008 | De La Motte |
| 2009/0132813 | A1 | 5/2009 | Schibuk |
| 2010/0070771 | A1* | 3/2010 | Chen .................. H04L 63/0823 713/176 |
| 2013/0091353 | A1* | 4/2013 | Zhang .................. H04L 9/3268 713/156 |
| 2013/0227656 | A1 | 8/2013 | Holtmanns et al. |
| 2015/0046339 | A1 | 2/2015 | Wong et al. |
| 2015/0327071 | A1 | 11/2015 | Sharma et al. |
| 2015/0332068 | A1 | 11/2015 | Bovee |
| 2016/0125490 | A1 | 5/2016 | Angal et al. |
| 2016/0294563 | A1 | 10/2016 | Qian |
| 2018/0082288 | A1 | 3/2018 | Chester et al. |
| 2018/0137484 | A1 | 5/2018 | Laracey |
| 2018/0167208 | A1 | 6/2018 | Le Saint et al. |
| 2018/0285875 | A1 | 10/2018 | Law et al. |
| 2018/0349904 | A1 | 12/2018 | Dave et al. |
| 2019/0044737 | A1 | 2/2019 | Singhi et al. |
| 2019/0318345 | A1 | 10/2019 | Kallugudde |
| 2020/0320488 | A1 | 10/2020 | Feng et al. |

OTHER PUBLICATIONS

"Patents Act 1977: Search Report under Section 17," mailed Aug. 3, 2023 in Great Britain Patent Application No. GB2309732.2. 1 page.

"Combined Search and Examination Report under Sections 17 and 18(3)," mailed Feb. 22, 2022 in Great Britain Application No. 2107380.4. 9 pages.

"Notification of Grant," mailed Oct. 4, 2022 in Great Britain Patent Serial No. 2600201. 2 pages.

"Search Report under Section 17," mailed Oct. 17, 2022 in Great Britain Application No. 2213693.1. 4 pages.

"Number used Once," downloaded from the The Wayback Machine (MeatballWiki / Recent Changes / Random Page / Indices / Categories). 2015, 3 pages.

"First Action Interview Pilot Program Pre-Interview Communication," mailed Jul. 22, 2022 in U.S. Appl. No. 17/031,609. 6 pages.

"Notice of Allowance," mailed Oct. 17, 2022 in U.S. Appl. No. 17/031,609. 11 pages.

Wikipedia, "Nonce (cryptographie)," The Wayback Machine. 2019 (Downloaded Mar. 14, 2023). 3 pages.

"Examination Report under Sections 12 & 13 of the Patents Act, 1970 and the Patents Rules, 2003," mailed Jan. 9, 2023. 6 pages.

"Written Opinion on the Patentability of the Invention," mailed Mar. 31, 2023 from the French Patent Office in Application No. FR2104707. 27 pages.

"Notice of Intention to Grant," mailed Apr. 28, 2023 in Great Britain Patent Application No. GB2213693.1. 7 pages which includes English translation of the claims.

"Patents Act 1977: Search Report under Section 17," mailed Sep. 27, 2023 in Great Britian Patent Application No. GB2313977.7. 4 pages.

"Non-Final Office Action," mailed Oct. 13, 2023 in U.S. Appl. No. 18/104,128. 7 pages.

"Notice of Allowance," mailed Feb. 14, 2023 in U.S. Appl. No. 18/104,128. 5 Pages.

"Notice of Allowance," mailed Feb. 14, 2023 in U.S. Appl. No. 17/946,246. 5 Pages.

"Examination Report and Notification of Intention to Grant under Section 18(4)," mailed Feb. 8, 2024 in Application No. GB2309732. 2. 2 pages.

"Examination Report," mailed Apr. 10, 2024, from the Intellectual Property of India in Application No. 202315048437. 6 pages (includes English translation).

"Non-Final Office Action," mailed Sep. 27, 2023 in U.S. Appl. No. 17/946,246. 8 pages.

"Office Action," mailed Jan. 31, 2023 from the French Republic Department of Industrial Property in Application No. FR2104707. 16 pages, includes English translation.

* cited by examiner

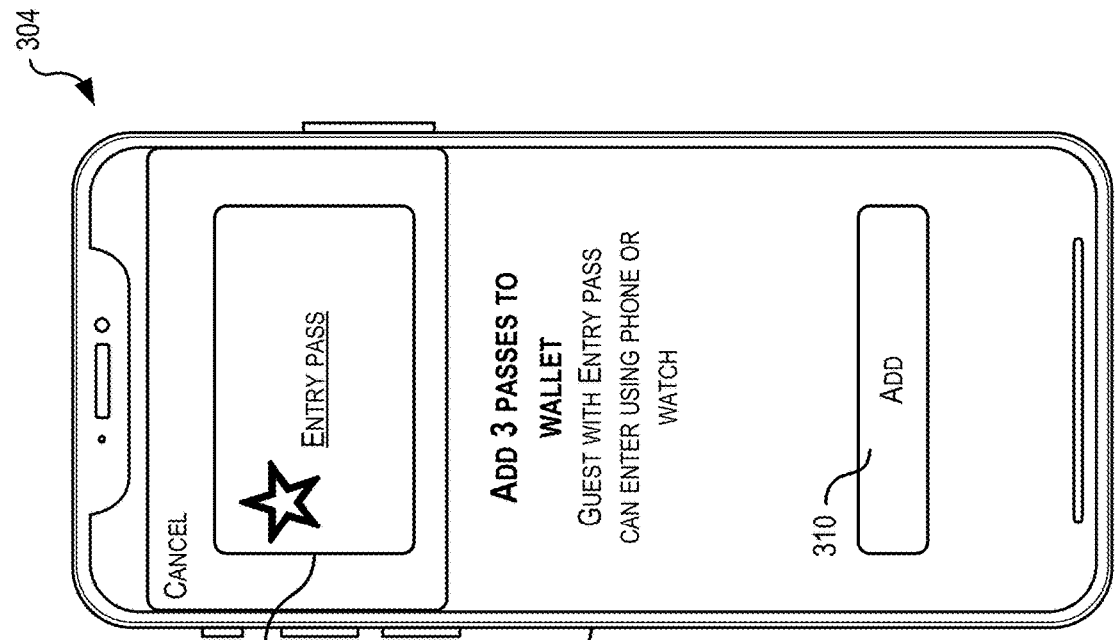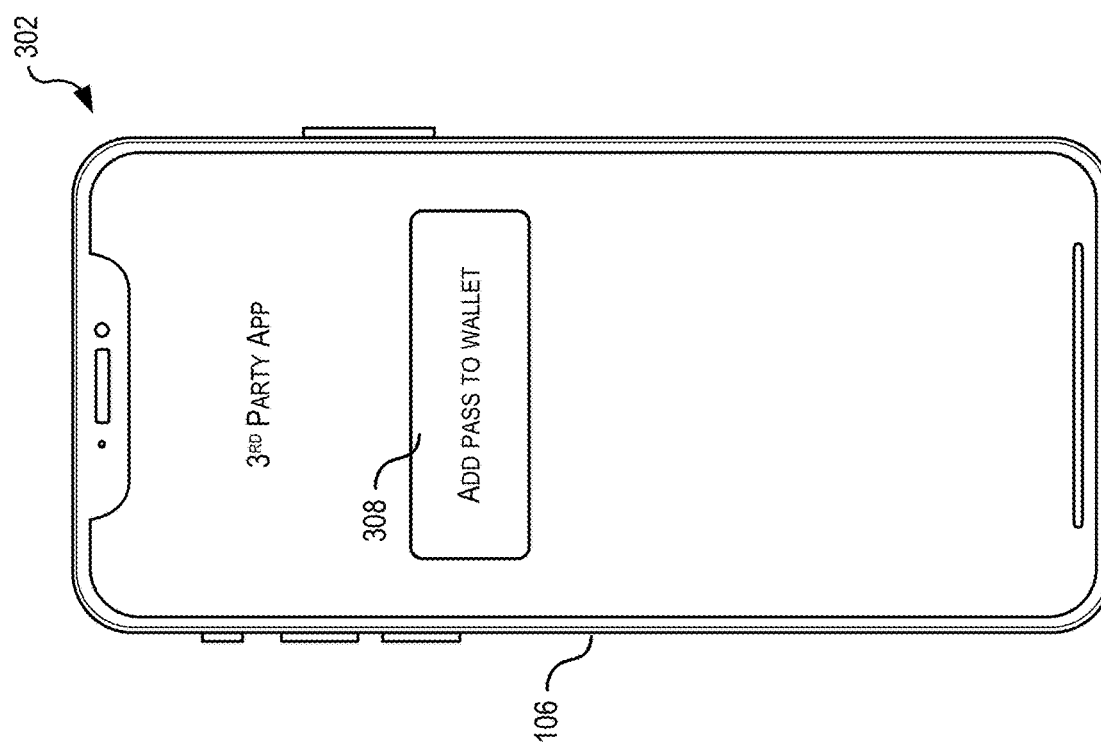
FIG. 3

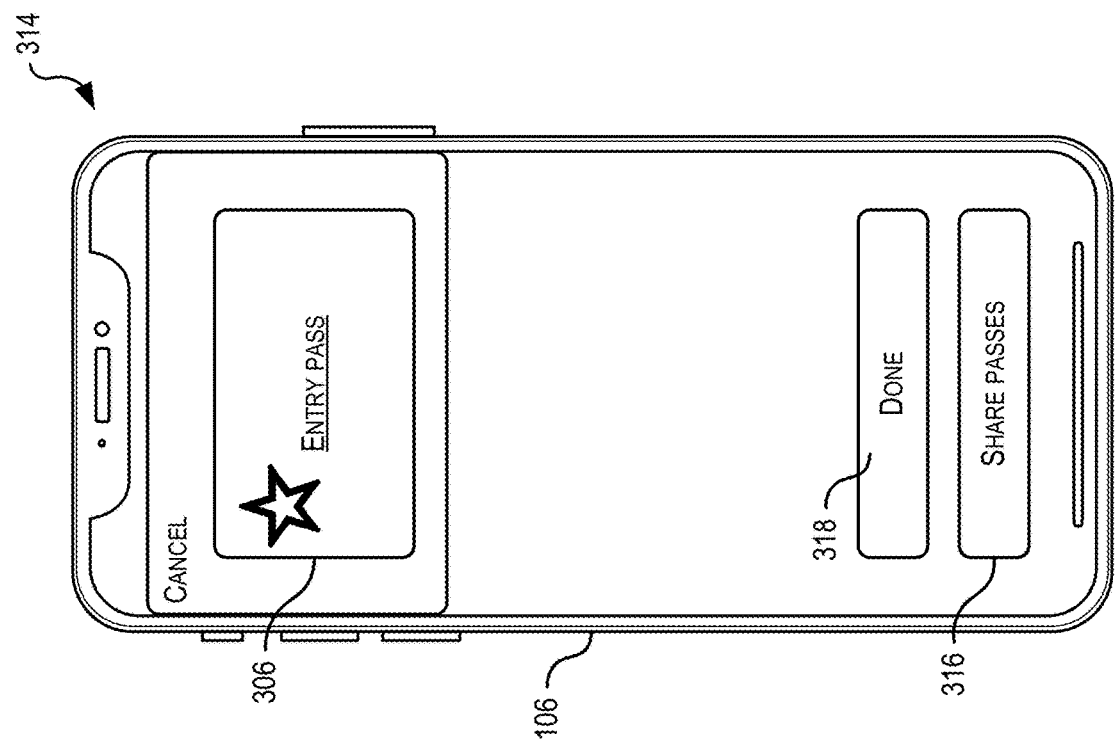
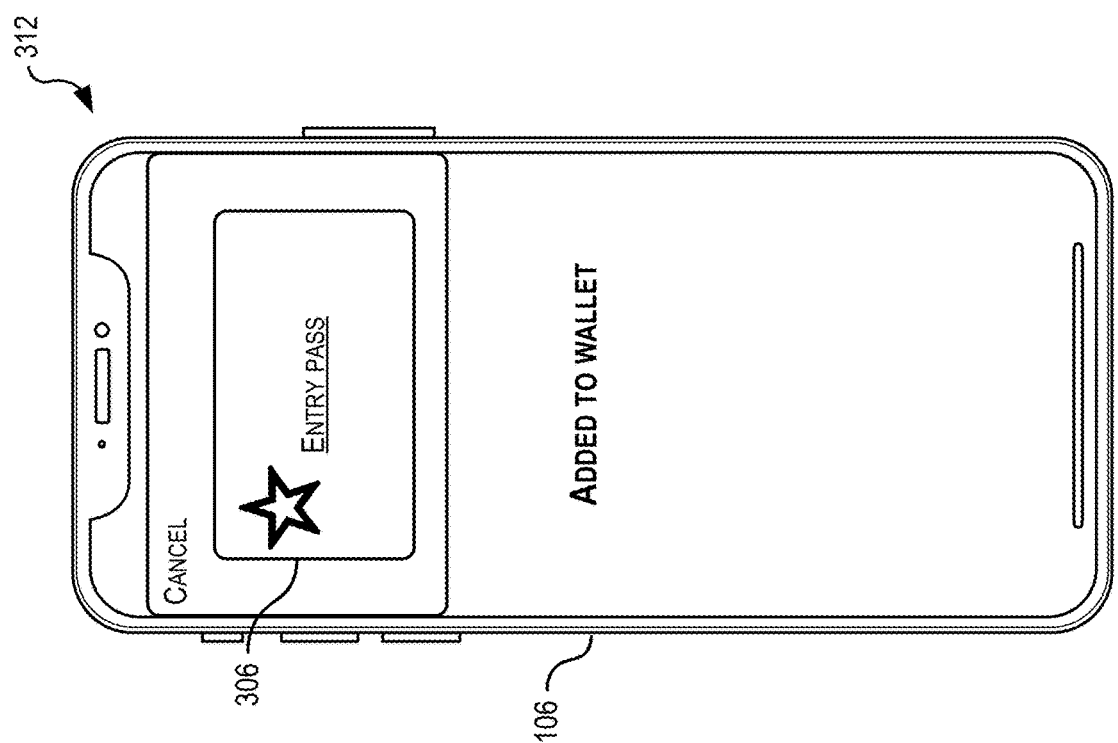
FIG. 4

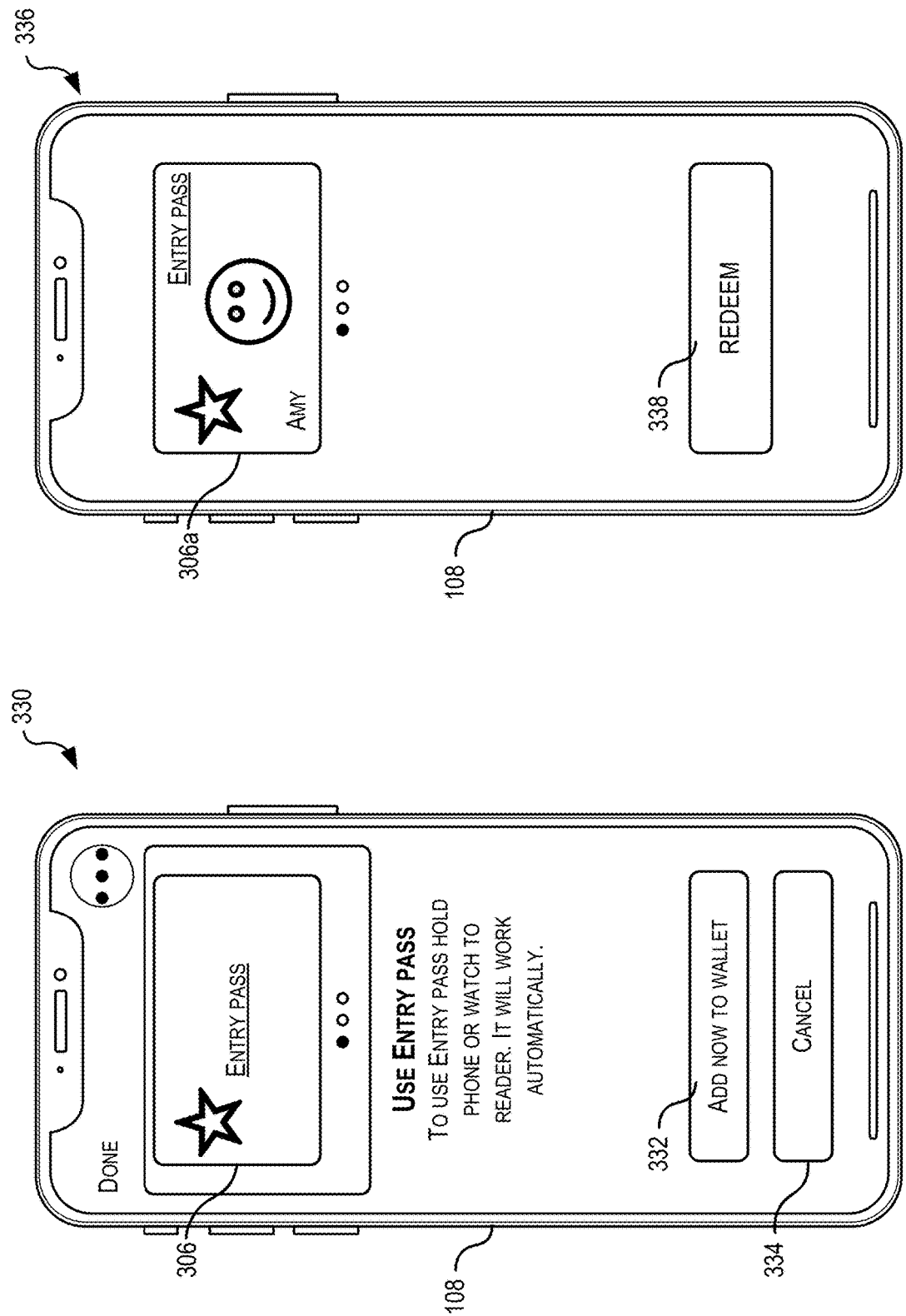

SECURE SHARING OF CREDENTIAL INFORMATION

CROSS-REFERENCE TO RELATED APPLICATION

The present application is a continuation of and claims priority to U.S. patent application Ser. No. 17/946,246, filed Sep. 16, 2022, which is a continuation of U.S. patent application Ser. No. 17/031,609 (now U.S. Pat. No. 11,606, 217), filed Sep. 24, 2020, which claims the benefit of and priority to U.S. Provisional Application No. 63/032,501, filed May 29, 2020. This application is related to U.S. Provisional Application No. 63/032,504, filed May 29, 2020 and U.S. patent application Ser. No. 18/104,128, filed Jan. 31, 2023. The full disclosure of which is incorporated by reference herein in its entirety for all purposes.

BACKGROUND

Portable electronic devices such as smartphones and smartwatches may include secure elements for hosting secure applications and storing relevant credential information. A secure element may be used to selectively share parts of the credential information during contactless transactions (e.g., contactless payment at a payment terminal, contactless debiting of a transit fare, etc.).

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method including, responsive to a first request from a first user device, providing a nonce and a provisioning certificate to the first user device, the nonce and the provisioning certificate relating to a provisioning request initiated by the first user device for provisioning a credential for use on a second user device. The computer-implemented method may also include receiving an encrypted provisioning target package from the first user device, the encrypted provisioning target package including the nonce and provisioning information for provisioning the credential for use on the second user device. The computer-implemented method may also include extracting at least a portion of the provisioning information from the encrypted provisioning target package. The computer-implemented method may also include provisioning the credential for use on the second user device based at least in part on the portion of the provisioning information. Other examples of this aspect include corresponding computer systems, apparatus, and computer programs recorded on one or more computer storage devices, each configured to perform the actions of the methods.

Another general aspect includes a computer-implemented method including receiving an indication that a user account has successfully logged into a web application associated with a provisioning system. The computer-implemented method may also include receiving an encrypted provisioning target package from an external computer system, the encrypted provisioning target package including provisioning information for provisioning a credential for use on a user device associated with the user account. The computer-implemented method may also include determining a list of user devices capable of receiving the credential based at least in part on the provisioning information, individual user devices of the list of user devices being associated with the user account. The computer-implemented method may also include receiving a selection of a particular user device from the list of user devices. The computer-implemented method may also include provisioning the credential for use on the particular user device based at least in part on the provisioning information. Other examples of this aspect include corresponding computer systems, apparatus, and computer programs recorded on one or more computer storage devices, each configured to perform the actions of the methods.

Another general aspect includes a computer-implemented method, including receiving, via a messaging system and from a first user device, a request to provision a credential for use on a second user device, the request including a provisioning target package that includes provisioning information. The computer-implemented method also includes validating, using the messaging system, a user account associated with the second device based at least in part on the provisioning information in the provisioning target package. The computer-implemented method also includes storing, using a cloud storage and compute system, the provisioning target package in a remote storage location associated with the user account. The computer-implemented method also includes validating, using a provisioning system, credential information associated with the credential based at least in part on the provisioning information in the provisioning target package. The computer-implemented method also includes provisioning the credential for use on the second user device based at least in part on validating the credential information. Other examples of this aspect include corresponding computer systems, apparatus, and computer programs recorded on one or more computer storage devices, each configured to perform the actions of the methods.

BRIEF DESCRIPTION OF THE DRAWINGS

FIG. 3 illustrates a user interface for provisioning credentials for use on user devices, according to at least one example.

FIG. 4 illustrates a user interface for provisioning credentials for use on user devices, according to at least one example.

FIG. 6 illustrates a user interface for provisioning credentials for use on user devices, according to at least one example.

DETAILED DESCRIPTION

Figure 1:
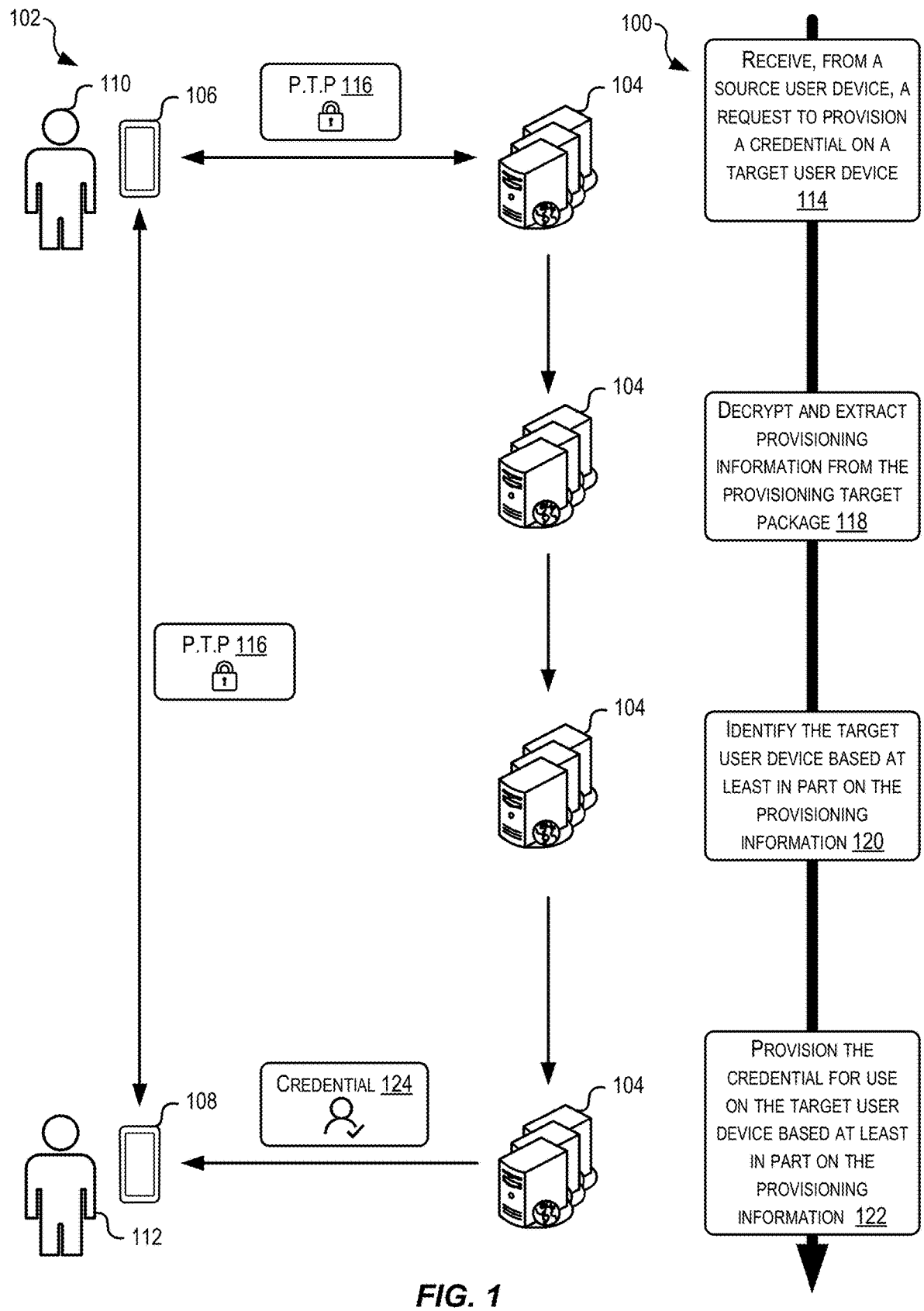
FIG. 1 illustrates a block diagram and a flowchart showing an example process for provisioning credentials for use on user devices, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable storage media for provisioning credentials on second user devices using provisioning processes initiated by a first user device. The credentials may include any suitable information (e.g., payment information for a credit card, unique account identifiers for electronic passes or tickets, etc.) useable to access a resource (e.g., payment funds, entrance to a venue associated with the ticket, access to entertainment at an amusement park, etc.). The credentials may be stored in secure elements on the user devices. A credential once stored in a secure element may be used to conduct contactless transactions (e.g., wireless communication with near field communication devices), which may include payment for goods and services, event and venue access, user identification, and the like.

Conventionally, credentials have been specifically requested by and provisioned on the same user device. For example, if a user desired to add a new payment card to a secure element on her mobile phone, she would use her mobile phone to perform a predefined process of interacting with a provisioning system to obtain and store a credential for the payment card in the secure element. If the user wanted to add the same payment card to a different user device (e.g., her child's mobile phone), the user would have to go through the same predefined process, but using the different user device. This may prove difficult or even impossible, especially, when the user wants to provision credentials across multiple devices not under the control of the user (e.g., devices owned by her friends).

Turning now to a particular example, a provisioning system is described that enables a user on a first mobile phone to request provisioning of a credential of any type (e.g., electronic pass) on a second mobile phone. Depending on how the request is initiated (e.g., using a third-party web page, from a third-party application on the first mobile phone, or using a digital wallet on the first mobile phone) and whether there is an existing relationship of trust between the user mobile phones, the provisioning on the second mobile phone may be performed automatically (e.g., without a user on the second mobile phone having to authenticate her account). For example, if the second mobile phone is within a group of trusted devices (e.g., devices that are all associated with a primary account, which belongs to the user of the first mobile phone), the provisioning may be performed automatically on the second mobile phone. If the second mobile phone is not part of the group of trusted devices, the user of the second mobile phone may be required to perform additional steps to authenticate an account of the user of the second mobile phone (e.g., providing cloud-based storage credentials to confirm that the second mobile phone is logged into the same account associated with the cloud-based storage credentials).

In a particular use case, a user may purchase, on behalf of a group of friends, electronic passes to an amusement park that includes near-field ticketing and debiting technology. Such technology may enable users to "tap" their mobile devices to reader devices (e.g., conduct a contactless transaction) to enter and exit the park, purchase items within the park, obtain access to rides and shows, etc. Such technology may require that each user device include its own unique credential that is associated with the user's respective electronic ticket. In this manner, the tickets may uniquely identify each friend in the group. Using the provisioning system described herein, the user may provision the electronic passes on behalf of her friends. To begin, the user may open, on her user device (e.g., a source user device), a third-party application hosted by the amusement park. Using this application, the user may request "sharing" of the purchased electronic passes with each friend. Once initiated, the source user device generates a provisioning target package and encrypts the provisioning target package using a provisioning certificate chain provided by the provisioning system. The provisioning target package is encrypted in such a way that only the provisioning system can decrypt the provisioning target package. After encryption using the provisioning certificate chain, the provisioning target package may further be encrypted by a transport service of a messaging system that sends the provisioning target package (e.g., end-to-end encryption). The messaging system may then send, via a messaging application on the source user device, the encrypted provisioning target package target user devices of each of the friends. Depending on the manner of sharing, the provisioning system or the messaging system may store the provisioning package. Each friend then opens the message and is led through a series of prompts, which includes authenticating his or her account with the provisioning system before the credential is activated on his or her respective device. Once activated, the friends can use their respective user devices to interact with the near-field ticketing and debiting technology, and because the credentials are unique to the accounts of the friends, the first user is not responsible for purchases of the friends.

The systems, devices, and techniques described herein provide several technical advantages that improve the security of provisioning credentials and processing transactions using secure credentials, and protect user privacy. For example, a nonce and a provisioning certificate (e.g., a provisioning certificate chain) are generated by the provisioning system, shared with the source user device, and used to encrypt a provisioning target package by the source user device. When the target user device authenticates with the provisioning system, it provides the nonce back to the provisioning system. The provisioning system is blind to the identity of the target account associated with the target user device until the target user device contacts the provisioning system for authentication and redemption. In this manner, only the intended recipient may authenticate and have the credential provisioned. In some examples, when the provisioning target package is sent only over a messaging system, the target provisioning package may be stored by the messaging system, not within the provision system.

As an additional technical advantage, the techniques described herein provide a more efficient process for provisioning credentials on remote devices. In particular, this process requires fewer click throughs, page views, data input at data input fields, and the like, as compared to conventional approaches. For example, in at least one example use case, a parent may send a credential to their child's watch and the child may be able to enter an amusement park by tapping their watch to a reader at the park without the child having ever interacted with a provisioning user interface at their watch. In this manner, the credential may be automatically provisioned on the child's watch without any input from the child.

When the target user device is a trusted user device, additional technical advantages include bandwidth savings and power-consumption savings on the target user device. Both advantages are the result of the provisioning occurring in a more or less automated manner. Unlike provisioning on a non-trusted user device, a trusted target user device is not required to exchange additional information with the provisioning system to authenticate its associated user account. Instead, the provisioning system relies on other stored information. This reduction in the amount of data that has to be transferred between the trusted target user device and the provisioning system results in bandwidth savings and less power consumption.

Turning now to the figures, FIG. 1 illustrates a block diagram 102 and a flowchart showing a process 100 for provisioning credentials for use on user devices, according to at least one example. The diagram 102 includes a service provider 104. As described in further detail with respect to FIG. 2, the service provider 104 is any suitable combination of computing devices such as one or more server computers, which may include virtual resources, capable of performing the functions described with respect to the service provider. Generally, the service provider 104 is configured to manage aspects of provisioning credentials on user devices.

The diagram 102 also includes a source user device 106 operated by a source user 110 and a target user device 108 operated by a target user 112. The source user device 106 and the target user device 108 may be the same type of user device, but different numbers are used here to designate that their respective functions differ depending on whether the device is used to request provisioning, e.g., the source user device 106, or is the device for which provisioning is requested, e.g., the target user device 108. The user devices 106 and 108 are any suitable electronic user device capable of communicating with other electronic devices over a network such as the Internet, a cellular network, or any other suitable network. In some examples, the user devices 106 and 108 may be a smartphone, mobile phone, smart watch, tablet, or other user device on which specialized applications can operate. The source user device 106 may be uniquely associated with the source user 110 (e.g., via an account used to log in to the source user device 106), and the target user device 108 may be uniquely associated with the target user 112 in the same manner. In some examples, the target user device 108 may also be associated with the source user device 106 via a link with the account of the source user 110. This link may make the target user device 108 a trusted user device with respect to the source user device 106.

FIGS. 1, 7A-7D, 8A-8E, 9, 10, and 11 illustrate example flow diagrams showing processes 100, 700, 800, 900, 1000, and 1100 according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 begins at 114 by the service provider 104 receiving, from the source user device 106, a request to provision a credential on the target user device 108. The request may be initiated within a third-party application. Under a trusted device scenario, the request may include a provisioning target package (PTP) 116. As described in further detail herein, the PTP 116 may have been generated by the source user device 106, responsive to receiving a nonce from the service provider 104. The PTP 116, or at least some portion of it, may also be sent to the target user device 108. In some examples, the PTP 116 is sent to the target user device 108 via a messaging application hosted by the service provider 104. In this manner, the PTP 116 may be copied and stored by the service provider 104 and also delivered to the target user device 108. In some examples, such as in an non-trusted device scenario, the service provider 104 may receive the PTP 116 from the target user device 108 after the target user device 108 receives the PTP 116 from the source user device 106.

At 118, the service provider 104 may decrypt and extract provisioning information from the PTP 116. This may include extracting credential information to obtain the credential from an external computer system that hosts the third-party application and maintains credentials associated with the third-party application or service. For example, the external computer system may be a banking system and the credential information may be used by the service provider 104 to interact with the banking system to request the appropriate credential to fulfill the request received at 114.

At 120, the service provider 104 may identify the target user device 108 based at least in part on the provisioning information. In some examples, the PTP 116 may identify the target user device 108, and block 120 may be used to determine the identity of the target user device 108 based on the provisioning information. The identity of the target user device 108 may be used for communicating with the external computer system as described previously.

At 122, the service provider 104 may provision the credential 124 for use on the target user device 108 based at least in part on the provisioning information. For example, this may include registering the target user device 108 to receive notifications relating to the credential 124. This may also include the service provider 104 sending a provisioning bundle that includes the credential 124 to the target user device 108. In addition to the credential 124, the provisioning bundle may include image(s) and metadata for representing the credential in the third-party application or within a digital wallet on the target user device 108. The target user device 108 may store the credential 124 and, in some examples, the image(s) and metadata in a secure element on the target user device 108.

Figure 2:
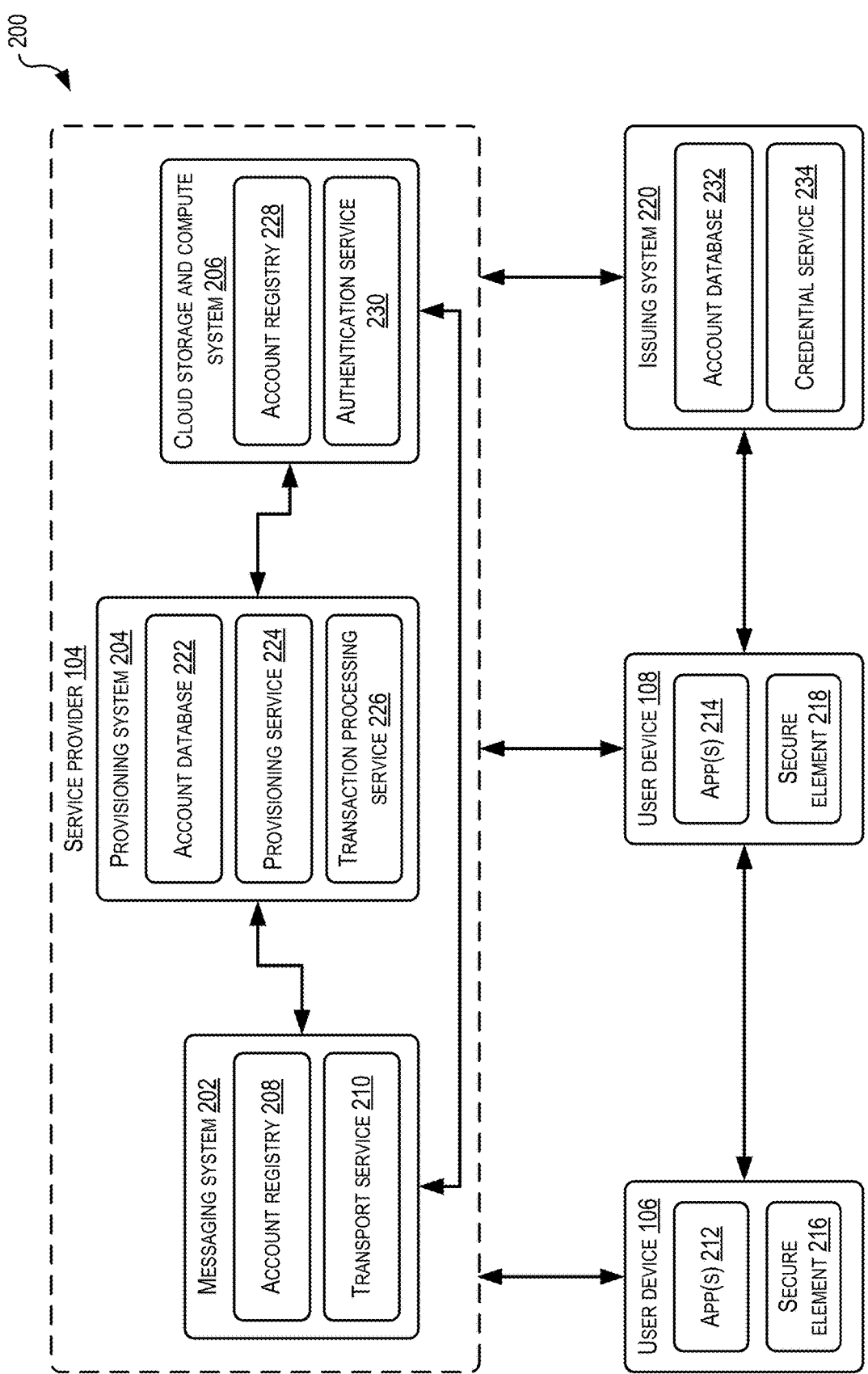
FIG. 2 illustrates a block diagram showing an example architecture or system for enabling provisioning of credentials for use on user devices, according to at least one example.

FIG. 2 illustrates a block diagram showing an example architecture or system 200 for enabling provisioning of credentials for use on user devices, according to at least one example. The system 200 includes a few elements introduced in FIG. 1. In particular, the system 200 includes the service provider 104, the source user device 106, and the target user device 108. The arrows between elements of the system 200 generally indicate that these element are communicatively coupled, either via a wired network connection, a wireless connection, or in any other suitable manner. However, the arrows should not be viewed as limited because at least some elements may communicate with each other, despite there not being arrows between them.

Beginning with the service provider 104, the service provider 104 may be operated by the same entity that sells the user device 106 and 108. In this manner, the user devices 106 and 108 may generally operate in an ecosystem hosted by the service provider 104. The service provider 104 includes a messaging system 202, a provisioning system 204, and a cloud storage and compute system 206. The messaging system 202 is generally configured to host messaging applications (e.g., one of the apps 212) on the user devices 106 and 108.

The user devices 106 and 108 each respectively include one or more app(s) 212 and 214, and a secure element 216 and 218. The secure elements 216 and 218 are used to store credentials, metadata, images, and other such information relating to the credentials. In some examples, the secure elements 216 and 218 provide a platform for conducting contactless transactions with payment terminals, entry terminals, and the like. In some examples, the secure elements 216 and 218 may be omitted from one or both of the user devices 106 and 108.

The apps 212 and 214 may be any suitable computer program or software application developed to run on a mobile device. The apps 212 and 214 may be pre-loaded on the user devices 106 and 108 (e.g., a messaging application, a mobile wallet application, an email application, etc.) and/or may be downloaded from an application store. In some examples, at least some of the apps available in the application store may be developed by third-parties, e.g., a party other than the developer of the pre-loaded applications and/or the operating system of the user devices 106 and 108. In some examples, these "third-party apps" may enable access to certain credentials. For example, a third-party banking application on the user device 106 may be used to load a credit card credential into the secure element 216, and share the credential with the user device 108. As described herein, doing so may include the user device 106 interacting with an issuing system 220. As an additional example, a third-party amusement part application on the user device 106 may enable access to electronic pass credentials for use in an amusement park, and for sharing the electronic pass credential with the user device 108. In some examples, the user device 106 may be used to share credential information obtained from a third-party application (e.g., the banking application) for credentials that are not stored in the secure element 216.

The messaging system 202 includes an account registry 208 and a transport service 210. The account registry 208 may be used to store registered device identifiers (e.g., phone numbers, email addresses, etc.) at which users may receive messages and from which users may send messages. In some examples, the device identifiers may be associated with the user accounts used to log in to the user devices. The transport service 210 is generally configured to enable transportation of messages by and between user devices that include the messaging applications. For example, the transport service 210 may enable messages to be sent between the user device 106 and the user device 108. In some examples, the transport service 210 may include functionality to enable end-to-end encryption of messages sent between the user devices 106 and 108 and other devices. For example, a messaging application on the user device 106 may be used to send an encrypted message including a PTP to the user device 108. In some examples, the messaging application encrypt and decrypt messages using keys that are not known to the messaging system 202 and/or the service provider 104. In some examples, one or both of the messaging system 202 and the cloud storage and compute system 206 may be operated by entities separate from the operator of the provisioning system 204. For example, a third-party entity may operate the messaging system 202 (e.g., a freeware cross-platform messaging service, a dedicated messaging application of a social media site, etc.). In this example, the PTP may be encrypted by the user device 106 and sent via the third-party's messaging system. When received by the user device 108, the PTP may be provided to the digital wallet on the user device 108 and the user device 108 may authenticate with the provisioning system 204 using the cloud storage and compute system 206 and share the PTP with the provisioning system 204.

Turning now to the provisioning system 204, the provisioning system 204 includes an account database 222, a provisioning service 224, and a transaction processing service 226. Generally, the account database 222 may be used for storing account information for users and their respective devices that interact with the provisioning system 204. The provisioning service 224 may be configured to perform operations described here with respect to FIGS. 10 and 11 relating to provisioning credentials on user devices. Thus, the provisioning service 224 may include functionality to decrypt certain encrypted messages, extract data, and communicate with the user devices 106 and 108, the messaging system 202, the cloud storage and compute system 206, and the issuing system 220. The transaction processing service 226 may be used to process payments and other contactless transactions.

Generally, the cloud storage and compute system 206 enables users to store data such as documents, photos, videos, etc. on remote servers, provides means for wirelessly backing up data on user devices, and provides data syncing between user devices. The cloud storage and compute system 206 includes an account registry 228 and an authentication service 230. The account registry 228 is used to store account information including registered device identifiers (e.g., phone numbers, email addresses, etc.) for users that utilize the cloud storage and compute system 206. In some examples, an account with the cloud storage and compute system 206 may be needed to initialize the user devices 106 and 108. In some examples, at least a portion of the account information in the account registry 228 is the same as at least a portion of the account information in the account registry 208. For example, a user may use the same email address (e.g., username) for both systems and may associate the same device identifiers for both systems. In this manner, the same user devices may be used to receive messages, per the account registry 208, and access remote files, per the account registry 228. In some examples, the account registry 228 may be used as a point of truth for authenticating user/user devices requesting credentials. The authentication service 230 may perform the function of authentication, as described herein.

Generally, the issuing system 220 may be operated by an entity other than the entity that operates the service provider 104. In particular, the issuing system 220 may be an example of an external computer system that issues credentials. For example, the issuing system 220 may be associated with a bank that issues a credit card, a theme park that issues an electronic pass, and any other type of entity that can issue a credential for the reasons described herein. The issuing system 220 includes an account database 232 and a credential service 234. Generally, the account database 232 is used to store account information that is specific to the issuing system 220. For example, this may be a user's login information for a bank account that is owned by the entity that operates the issuing system 220. The account information may also identify associations between user devices having third-party applications published by the issuing system 220 and users whose account information is stored in the account database 232. The credential service 234 may be configured to generate credentials for transport to the user devices 106 and 108 responsive to requests and in any other suitable manner described herein.

FIG. 3-6 illustrates example user interfaces for provisioning credentials for use on user devices, according to various examples. Beginning with FIG. 3, in FIG. 3 are illustrated user interfaces 302 and 304 presented on the source user device 106. The user interface 302 is presented in a third-party application and provides a button 308 for a user to add one or more passes 306 (e.g., an electronic pass credential) associated with the third-party application to the source user device 106. For example, the third-party application may be hosted by the issuing system 220 and may relate to a service offered by the issuing system 220 (e.g., an amusement park including near-field ticketing and debiting technology).

Selection of the button 308 may cause the source user device 106 to present the user interface 304. The user interface 304 provides a graphical depiction of the pass 306 and indicates that three passes are available for adding to the digital wallet (e.g., the secure element) on the source user device 106. Three passes may be available to add to the wallet because the user previously purchased three tickets into the amusement park, e.g., using the third-party application or using a different method. In any event, the third-party application may include the information about the number of tickets and whom the tickets are for. For example, the three passes may uniquely identify three users (e.g., the purchaser and two friends, the purchaser and her two children, etc.). To add the passes to the user's wallet, the user may select button 310.

Selection of the button 310 may cause the source user device 106 to present user interface 312 in FIG. 4. The user interface 312 acts as a confirmation that the passes 306 have been added to the digital wallet of the source user device 106. From the digital wallet and/or from the third-party application, the user may select to share the passes 306, as depicted in user interface 314 in FIG. 4. In particular, the user may select button 316 to share the passes 306 with others, or select button 318 to be done at this time instead of sharing.

Figure 5:
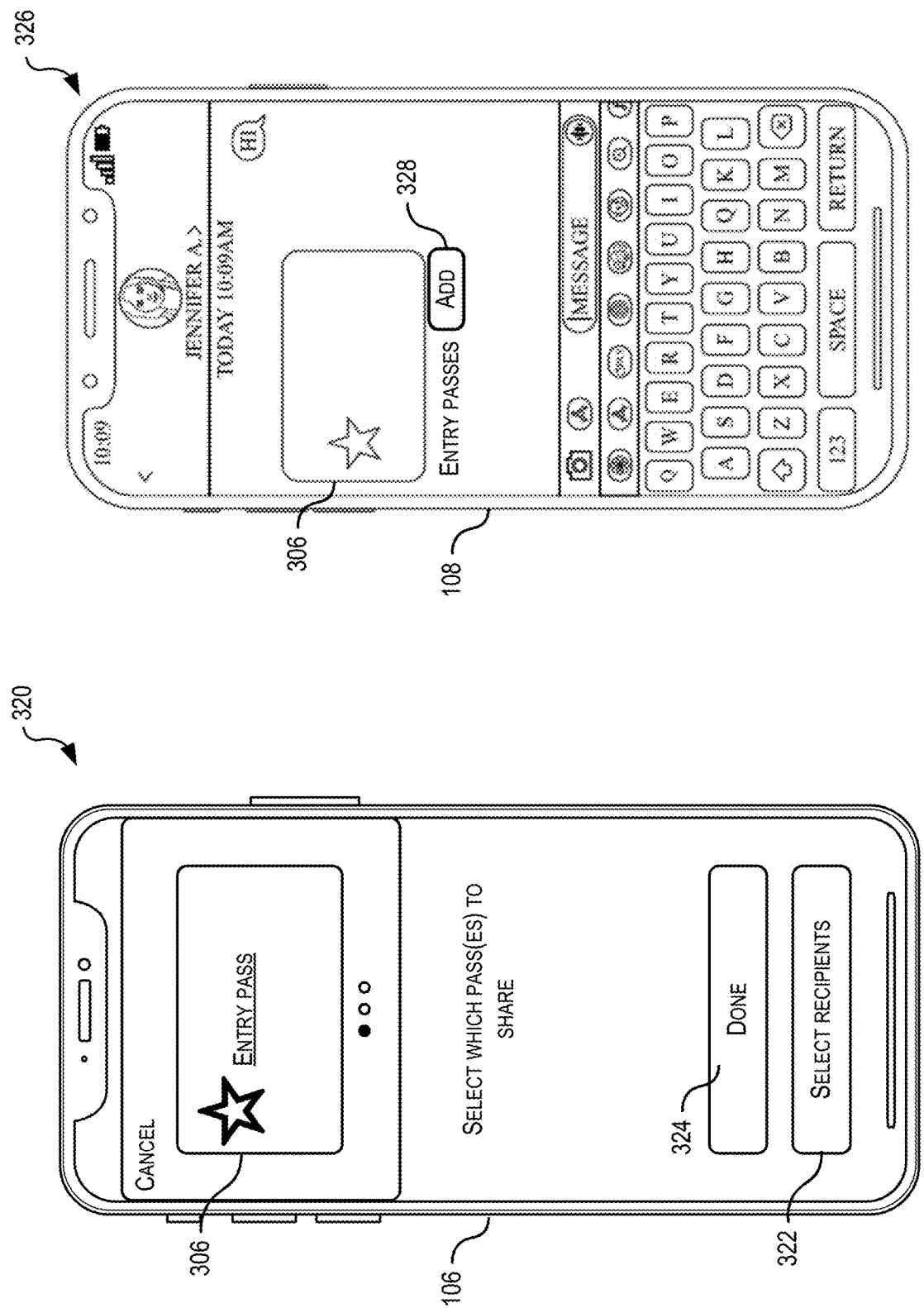
FIG. 5 illustrates a user interface for provisioning credentials for use on user devices, according to at least one example.

Selection of the button 316 may cause the source user device 106 to present user interface 320, as shown in FIG. 5. The user interface 320 provides the user with an option to selection which of the three passes 306 to share by selecting recipients using button 322. For example, selection of the button 322 may cause the source user device 106 to pull up a list of devices capable of receiving the pass 306 and which is associated with the source user device 106 (e.g., is a stored contact, or is part of trusted circle, etc.). In some examples, the list may also be sorted to include those accounts associated with devices that are capable of receiving and storing credentials such as the pass 306. Since the passes 306 may uniquely identify users, the list may be pre-populated to match the identities of the users identified by the passes 306. In some examples, the user of the source user device 106 may search for and select which users with which to share the pass 306 using the messaging application on the source user device 106. In some examples, the user interface 320 may be used to initiate sharing of the passes 306 without the user having to access the messaging application. The fact that the message was sent, however, may be stored in a conversation with the user with whom the pass 306 was shared. If the user desires not to share passes at this time, she may select button 324 to end the sharing flow.

Selection of the button 322 (and any corresponding selections of recipients, as described herein) may cause the source user device 106 to send a message to the target user device 108, which includes a user interface 326. The user interface 326 is a messaging application on the target user device 108 that indicates that a new message has been received from Jennifer. In this example, Jennifer is the user of the source user device 106 that selected to share the passes 306 with the target user device 108. In this example, the target user device 108 has received all three passes 306. In some examples, the target user device 108 may receive a single pass 306. To add the passes 306, the user may select a add button 328 included in the user interface 326. This will add the passes to the user's digital wallet.

Selection of the view button 328 may cause the target user device 108 to present user interface 330. The user interface 330 may be presented within the third-party application (e.g., amusement park application) on the target user device 108, within the messaging application on the target user device 108, or within the digital wallet on the target user device 108. The user may swipe left to right and right to left through the passes 306 to view the passes 306. To add the passes to the digital wallet on the target user device 108, the user may select an add to wallet button 332. Selection of add to wallet button 332, will cause the target user device 108 to perform any additional authentication to download the credentials associated with the passes 306. This may include the target user device 108 communicating with the service provider 104 and/or the issuing system 220. Alternatively, the user may cancel adding the passes 306 by selecting a cancel button 334.

Once the passes 306 have been added to the virtual wallet, the passes may be visible in the virtual wallet, as depicted by user interface 336 in FIG. 6. In particular, a first pass 306a is depicted as belonging to "Amy," a second pass may belong to "Jennifer" (the owner of the target user device 108), and a third pass may belong to "Charles" (the owner of the source user device 106). From the digital wallet, the user may redeem the passes 306 one at a time or all at once using button 338. Redeeming the passes 306 may include activating the passes for use within some time period. If, instead of passes 306, the credentials were credit cards, the button 338 may be needed because the credit card credentials may not need to be "redeemed," e.g., they may be activated once they are added to the virtual wallet. Tickets, passes, and the like, however, may be redeemed for use.

FIGS. 7A-7D illustrate a sequence diagram 700 showing example processes for provisioning credentials for use on user devices, according to various examples. In particular, the sequence diagram 700 depicts processes for provisioning credentials within a third-party application, such as the process described with respect to FIGS. 3-6.

As elements in the sequence diagram 700, FIGS. 7A-7D include the user 702 (e.g., the source user 110), an issuer application 704 (e.g., a third-party application), a source provisioning device 706 (e.g., the source user device 106), a target provisioning device 708 (e.g., the target user device 108), a provisioning system 710 (e.g., the provisioning system 204), and an external computer system 712 (e.g., the issuing system 220). The issuer application 704 may execute on the source provisioning device 706.

Figure 7A:
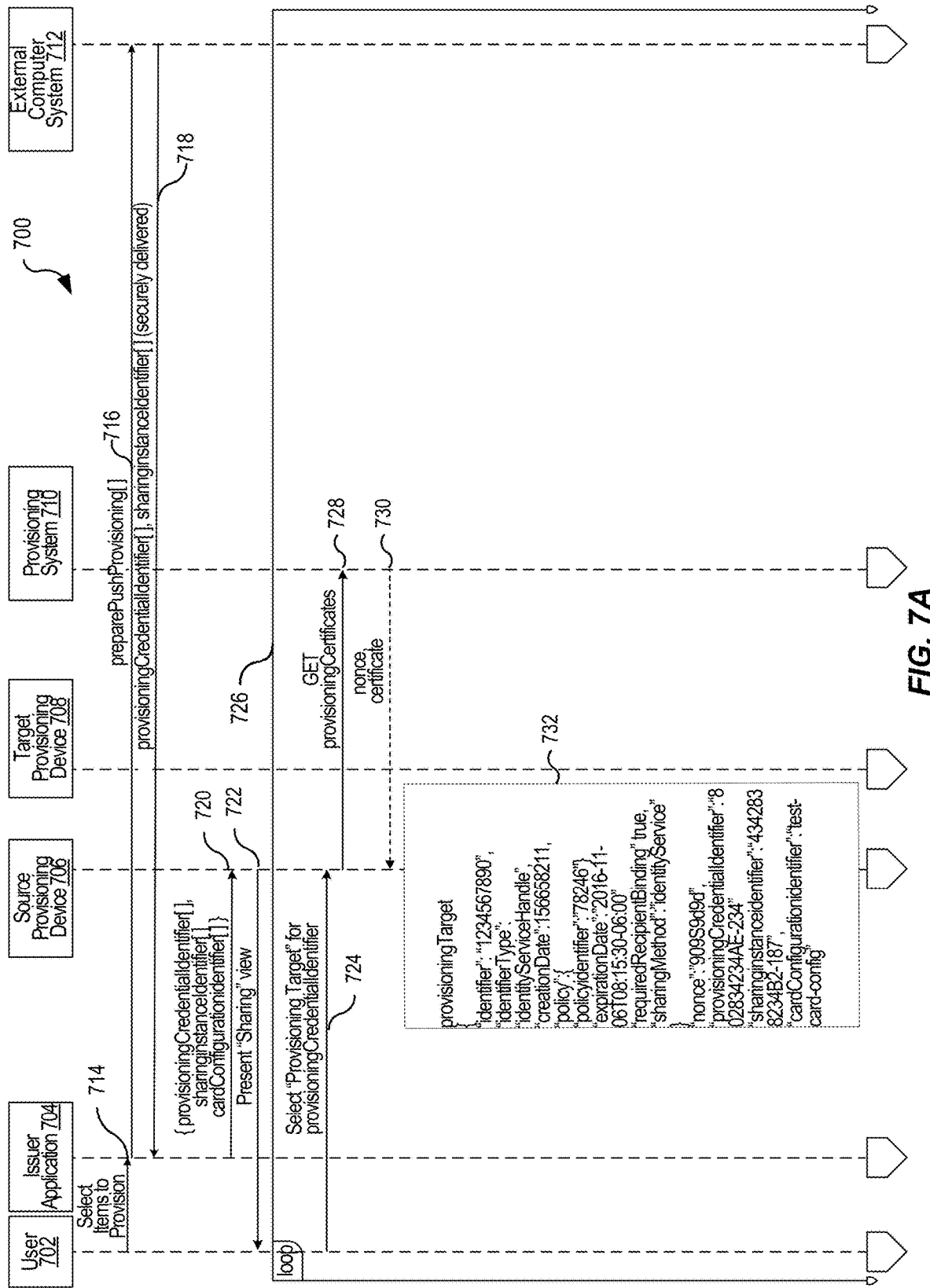
FIGS. 7A-7D illustrate a sequence diagram showing example processes for provisioning credentials for use on user devices, according to various examples.

Beginning with FIG. 7A, at 714, the user 702 selects items to provision. This may include selecting to share a pass, ticket, credit card, or the like with a different user. At 716, the issuer application 704 sends a message to the external computer system 712 that requests information for provisioning. In response, at 718, the external computer system 712 sends a provisioning credential identifier (e.g., an identifier that identifies the credential to share) and a sharing instance identifier (e.g., an identifier that identifies the sharing instance) to the issuer application 704. These identifiers are sent using a secure transport mechanism.

At 720, the issuer application 704 uses the information received from the external computer system 712 at 718 to cause the source provisioning device 706 to present a "sharing view" to the user 702, at 722. At 724, within a box 726 depicting a loop, the user 702 selects, at the source provisioning device 706, a provisioning target for provisioning the credential identifier. In response, at 728, the source provisioning device 706 requests provisioning certificate(s) from the provisioning system 710. The provisioning certificate (e.g., a certificate chain) is used to provide an encryption key that the source provisioning device 706 can be used for encrypting the provisioning target package. This ensures that the encryption key came from the service provider and is valid. The certificate chain may be validated by the provisioning system 710 by ensuring that the provisioning certificate is anchored to a production Root certificate authority and has not been revoked, among other things. In response to this request, at 730, the provisioning system 710 sends a nonce and the provisioning certificate to the source provisioning device 706. At 732, the source provisioning device 706 uses the nonce and other information to generate a provisioning target package (e.g., the PTP 116).

Figure 7B:
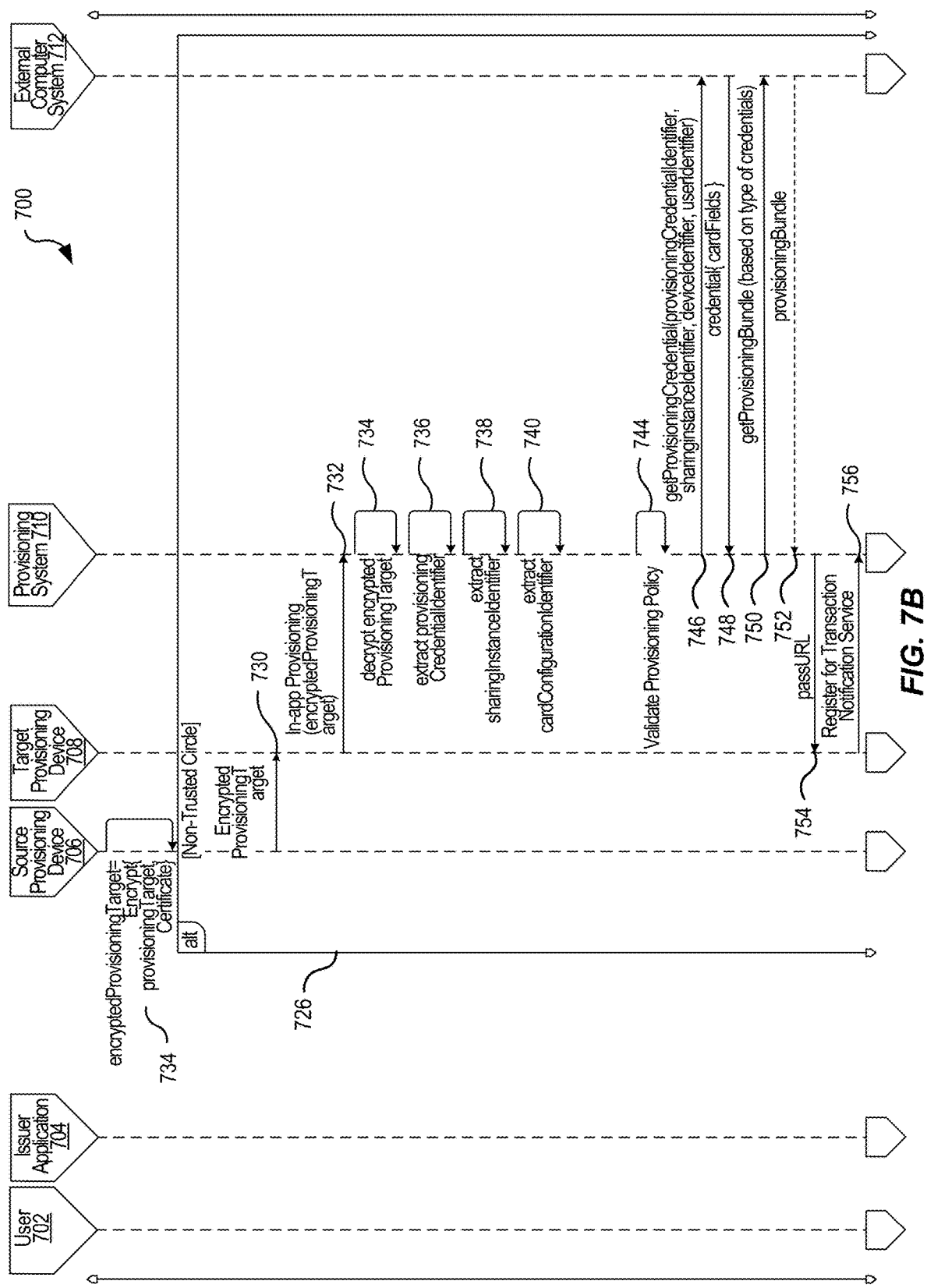
Figure 7C:
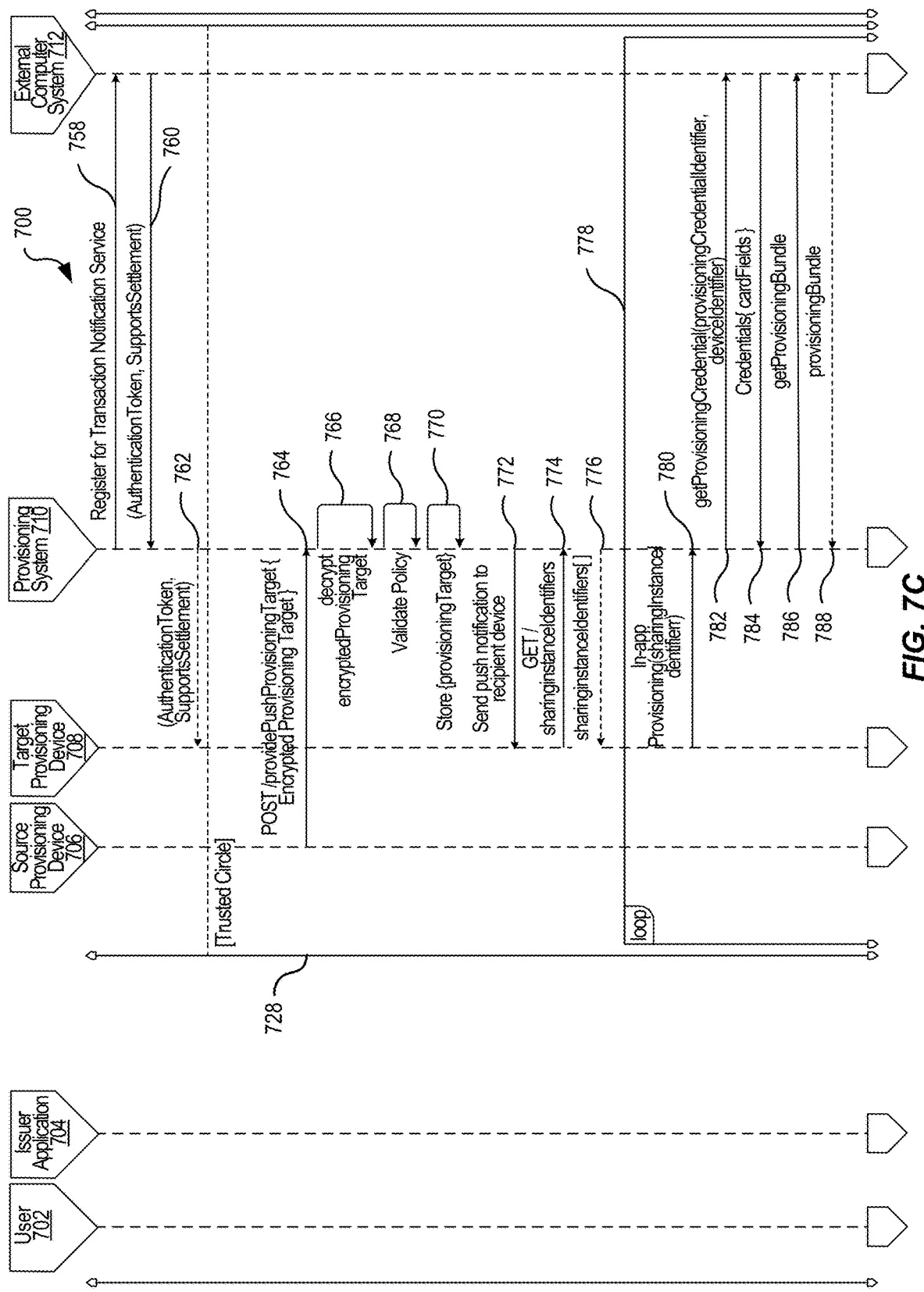
Figure 7D:
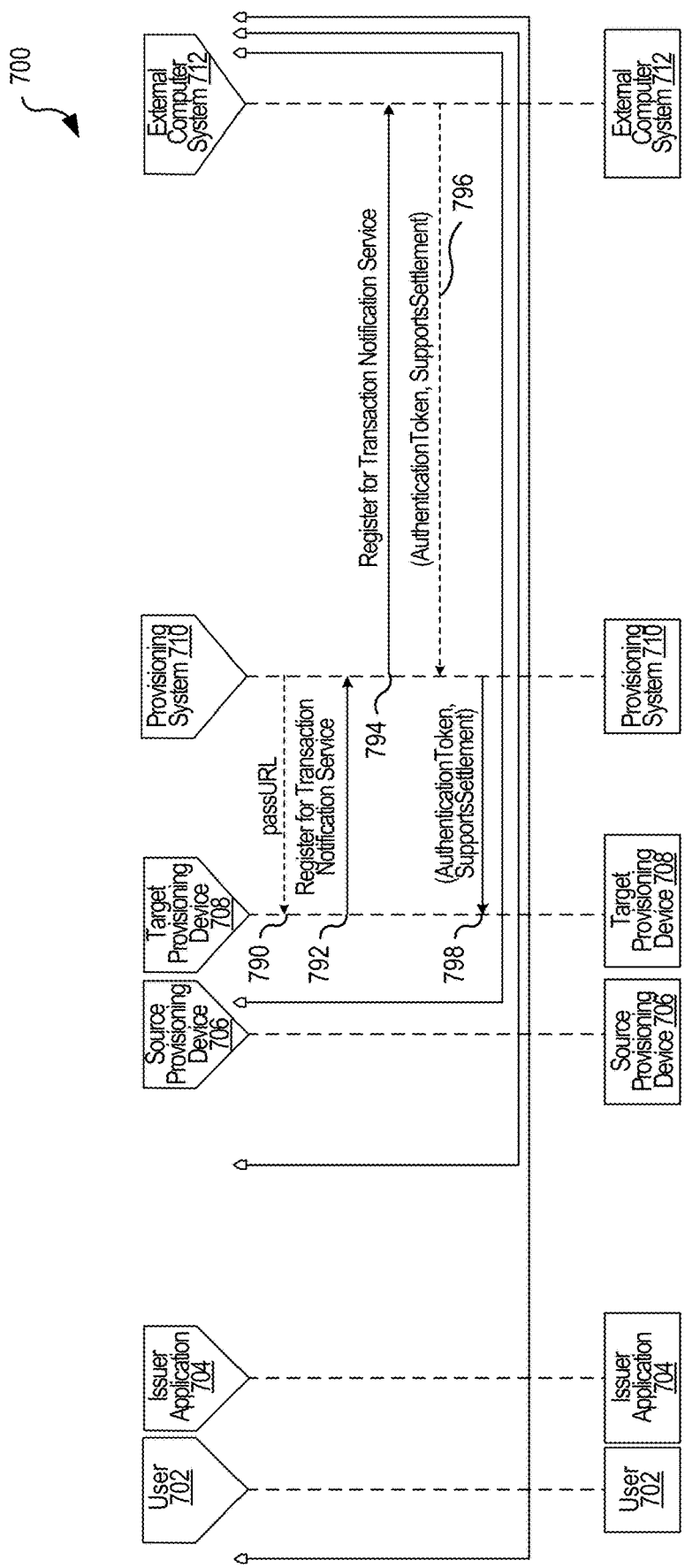

Turning now to FIG. 7B, at 734, the source provisioning device 706 encrypts the provisioning target package that was generated at 732. This may include encrypting the certificate as well. Box 726 depicts an alternate sequence that is performed when the target provisioning device 708 is outside of a "trusted circle." As described herein, user accounts may be associated to enable sharing such as via family members or others that have been invited into the trusted circle. Devices and accounts within the trusted circle may be treated differently during credential provisioning, as depicted in box 726. Box 728 in FIG. 7C depicts a sequence for provisioning when the target provisioning device 708 is within the trusted circle. In some examples, membership of the recipient (e.g., user of the target provisioning device 708) in the trusted circle of the sender (e.g., the user of the source provisioning device 706) is validated by the provisioning system 710 at the time of redemption of the credential.

Returning to the box 726, at 730, the source provisioning device 706 sends the encrypted provisioning target to the target provisioning device 708. In some examples, this may be performed using a messaging application and the messaging system 202. For example, the encrypted provisioning target may arrive in a conversation in the messaging application on the target provisioning device 708, as depicted in the user interface 326. At 732, the target provisioning device 708 begins the process of in-app provisioning by sending the encrypted provisioning target package to the provisioning system, as generally depicted in the user interface 330.

At 734, the provisioning system 710 may decrypt the encrypted provisioning target package, after which, at 736-740, the provisioning system 710 may extract provisioning information from the provisioning target package, e.g., credential identifier, sharing instance identifier, and card configuration identifier. The credential identifier and the sharing instance identifier were previously obtained by the external computer system 712 from the issuer application 704 at 718. The card configuration identifier is used to identify the correct partner for obtaining the provisioning credential, at 746. At 744, the provisioning system 710 validates a provisioning policy that is included in the provisioning target package.

At 746, the provisioning system 710 sends a get provisioning credential request to the external computer system 712. This request may include at least a portion of the provisioning information extracted from the provisioning target package (e.g., provisioning credential identifier, sharing instance identifier, device identifier, and user identifier). In response, the external computer system 712, at 748, sends the provisioning system 710 the credential. In response, at 750, the provisioning system 710 sends a request to get a provisioning bundle, which will depend on the type of credentials. The provisioning bundle may include metadata, image files, and the like for presenting the credential in the virtual wallet on the target provisioning device 708. In response, at 753, the external computer system 712 sends the provisioning bundle to the provisioning system 710. Once the provisioning system 710 is in receipt of the provisioning bundle, the provisioning system 710 may pass a URL to the target provisioning device 708, at 754. In response, at 756, the target provisioning device 708 registers with the provisioning system 710 for transaction notification. Transaction notification may be implemented by the transaction processing system.

Continuing with the box 726 in FIG. 7C, at 758, the provisioning system 710 registers for transaction notification service with the external computer system 712. In some examples, registration at 758 may be optional. For example, registration at 758 may be performed if the external computer system 712 supports providing notifications when transactions occur. In response, at 760, the external computer system 712 provides credential information including at least an authentication token and a settlement data element to the provisioning system 710. At 762, the provisioning system 710 provides the credential information to the target provisioning device 708.

As introduced herein, the box 728 in FIG. 7C depicts a sequence for provisioning when the target provisioning device 708 is within the trusted circle. In this example, at 764, which is performed after 734 (outside of the boxes 726 and 728), the source provisioning device 706 sends the encrypted provisioning target package directly to the provisioning system 710. At 766, the provisioning system 710 decrypts the encrypted provisioning target package. At 768, the provisioning system 710 validates the policy from the provisioning target package. At 770, the provisioning system 710 stores the provisioning target package. At 772, the provisioning system 710 sends a push notification to the target provisioning device 708. In response, the target provisioning device 708 requests, at 774, and receives, at 776, provisioning information that includes sharing instance identifiers.

At this point, the loop box 778 is performed. The portion of the loop box 778 on FIG. 7C includes 780 and 782 to 788. At 780, the target provisioning device 708 begins in-app provisioning by sharing a provisioning instance identifier with the provisioning system 710. At 782, the provisioning system 710 requests credential information, e.g., a provisioning credential that includes a provisioning credential identifier and a device identifier. 784 to 788 correspond, respectively, to 748 to 752 of FIG. 7B. Similarly, 790 to 798 in FIG. 7D correspond, respectively, to 754 to 762.

In some examples, when the user 702 chooses a recipient (e.g., a messaging account identifier) to receive the credential, the credential may be bound to that recipient via a call made by the source provisioning device 706 with the provisioning system 710. That call may contain the credential identifier and the recipient's messaging account identifier. The provisioning system 710 may track that mapping and at redemption time ensures that the redeeming device (e.g., the target provisioning device 708) is signed into an account on the cloud storage and compute system 206 associated with the messaging account identifier provided by the source provisioning device 706 at binding time. In this example, the provisioning system 710 may store the mapping between sender and recipient prior to redemption by the redeeming device.

Alternatively, in some examples, credentials are not bound to a recipient cloud storage and compute system 206 account at sharing time. The external computer system 712 (e.g., the system that issues the credential) may provide a credential identifier to the virtual wallet of the source provisioning device 706, which allows the user to send the credential using a messaging application and the messaging system 202 to anyone. Anyone with the credential identifier can use it to provision the credential in their virtual wallet. In some examples, the credential identifier may be bound to the first cloud storage and compute system 206 account that redeems it. In this manner, it may be difficult for others to redeem the credential.

FIG. 8A-8E illustrate a sequence diagram 800 showing example processes for provisioning credentials for use on user devices, according to various examples. In particular, the sequence diagram 800 depicts processes for provisioning credentials, using a browser and web application provided by a third-party. For example, the sequence diagram 800 may correspond to a process by which a user provisions credit card credentials for her own user devices and/or for other user devices via a webpage hosted by the bank that supports the credit card. In this example, the external computer system takes a more active role in authenticating the user devices.

As elements in the sequence diagram 800, FIGS. 8A-8E include a browser 802 (e.g., a browser application on the source user device 106), an external computer system 804 (e.g., the issuing system 220), a web application 806 (e.g., a web application hosted by a provisioning system 808), the provisioning system 808 (e.g., the provisioning system 204), a target provisioning device 810 (e.g., the target user device 108), and other computer system 812 (e.g., the issuing system 220). As described herein, in some examples, the source device 106 does not include a secure element.

Figure 8A:
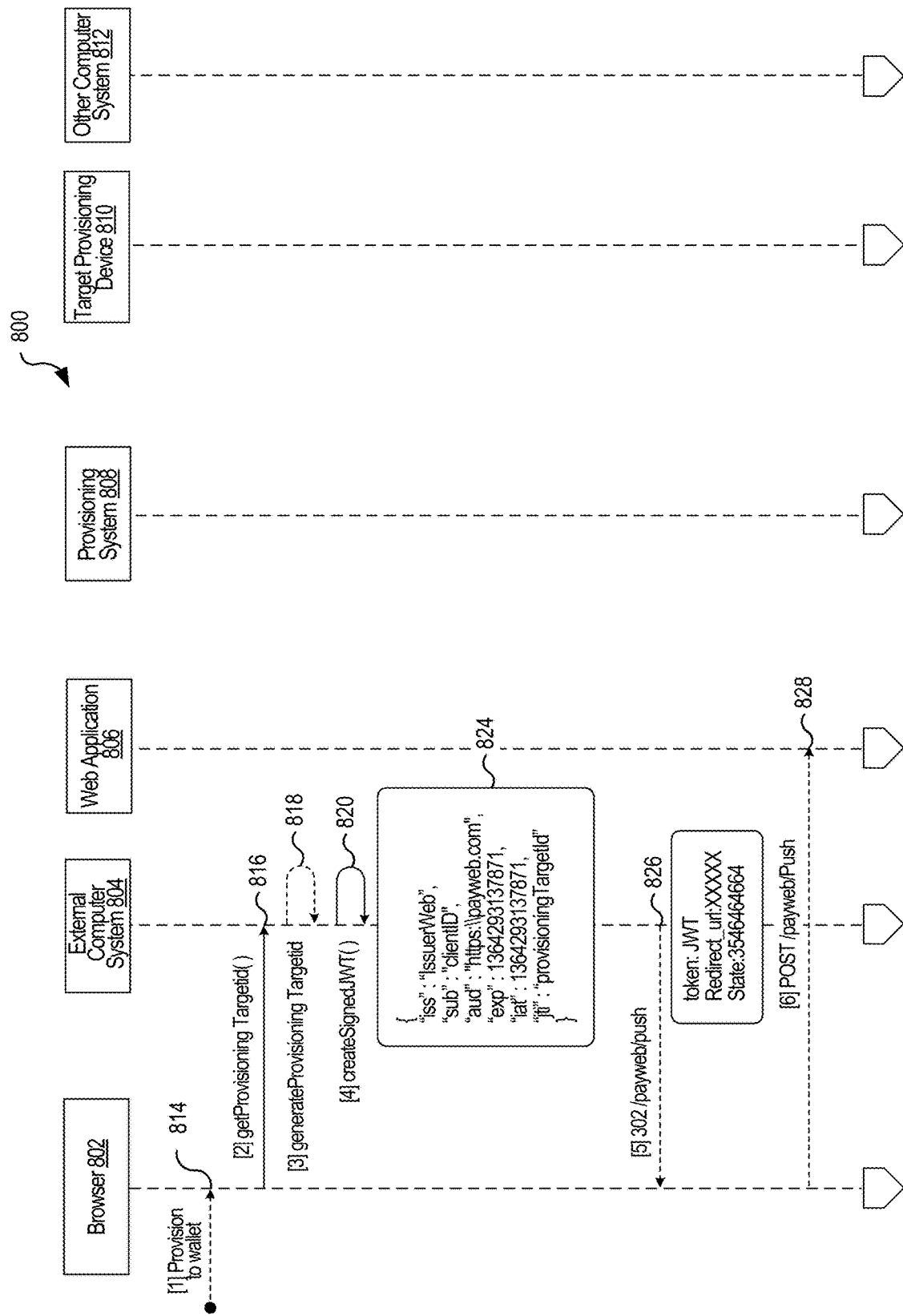
FIGS. 8A-8E illustrate a sequence diagram showing example processes for provisioning credentials for use on user devices, according to various examples.

Beginning with FIG. 8A, at 814, the browser gets a request to provision to a digital wallet. This may be received as a user input received at a webpage of the external computer system 804 presented at the source provisioning device. At 816, the browser 802 sends a request to the external computer system 804 requesting provisioning information including a provisioning target ID. In response, the external computer system 804, at 818, generates the provisioning target ID. At 820, the external computer system 804 creates a signed token (e.g., a JSON web token), 824. The token 824 identifies the external computer system 804 as the issuer. At 826, the external computer system 804 sends a notification to the browser 802. In response, at 828, the browser 802 sends a post to the web application 806.

Figure 8B:
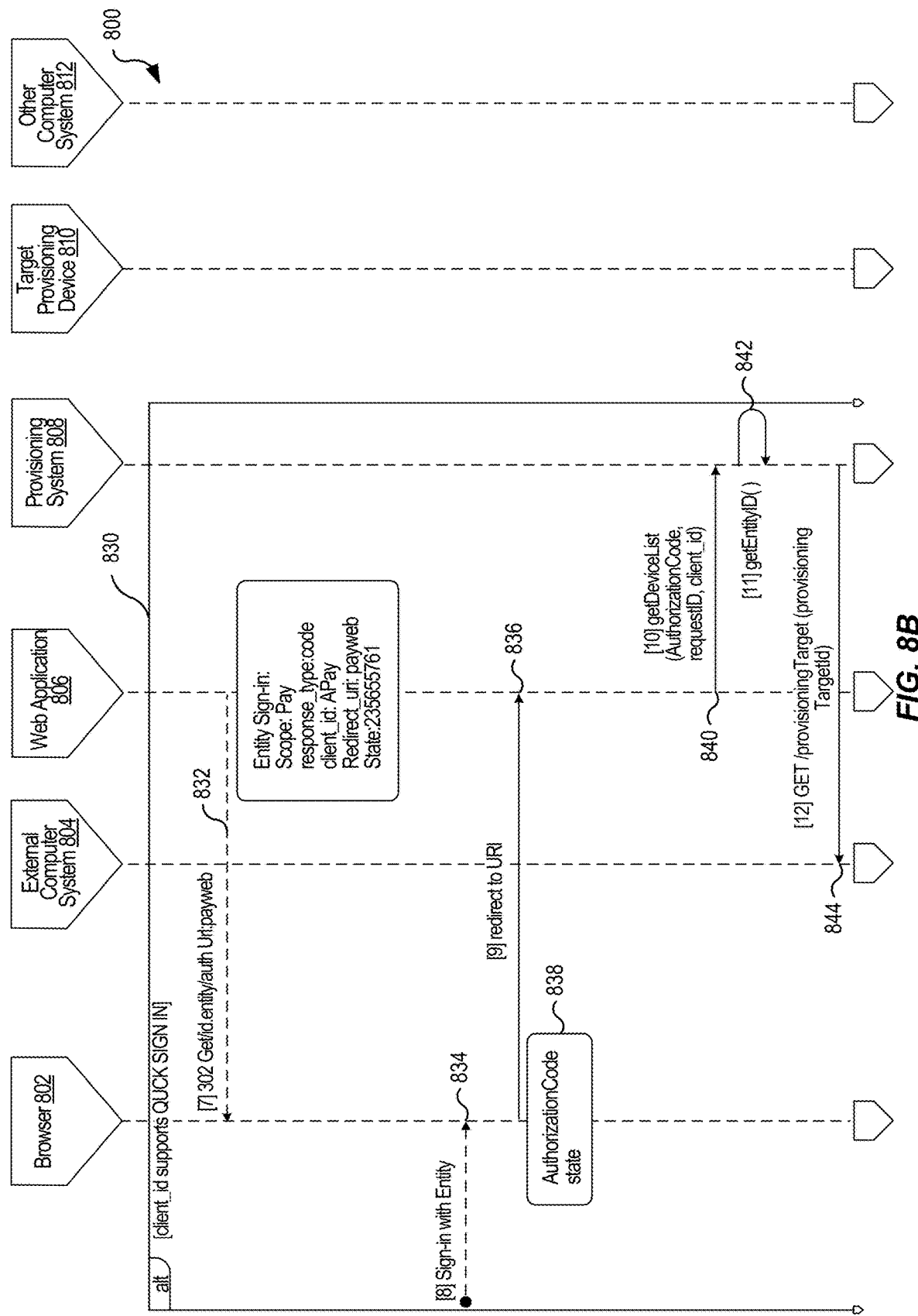

Turning now to FIG. 8B, FIG. 8B includes an alternate box 830, which is performed when the client ID associated with the browser 802 and associated application support quick sign-in. Quick sign in may enable the user to use her credentials for the web application 806 to sign-in at the browser 802. In some examples, this may be referred to as "Sign In with Entity." At 832, the web application 806 sends a message to the browser 802 to request sign-in credentials. At 834, the user signs in with the entity, using the browser 802, which causes the browser 802, at 836, to redirect to the web application 806. If applicable, an authorization code 838 may be input at the browser 802 to authorize the sign-in attempt with the entity using the web application 806. At 840, the web application 806 requests, from the provisioning system 808, a device list using the authorization code, request ID, and client ID. Responsive to the request, the provisioning system 808, at 842, determines the entity ID and requests a provisioning target package based on the provisioning target ID to the external computer system 804 at 844.

Figure 8C:
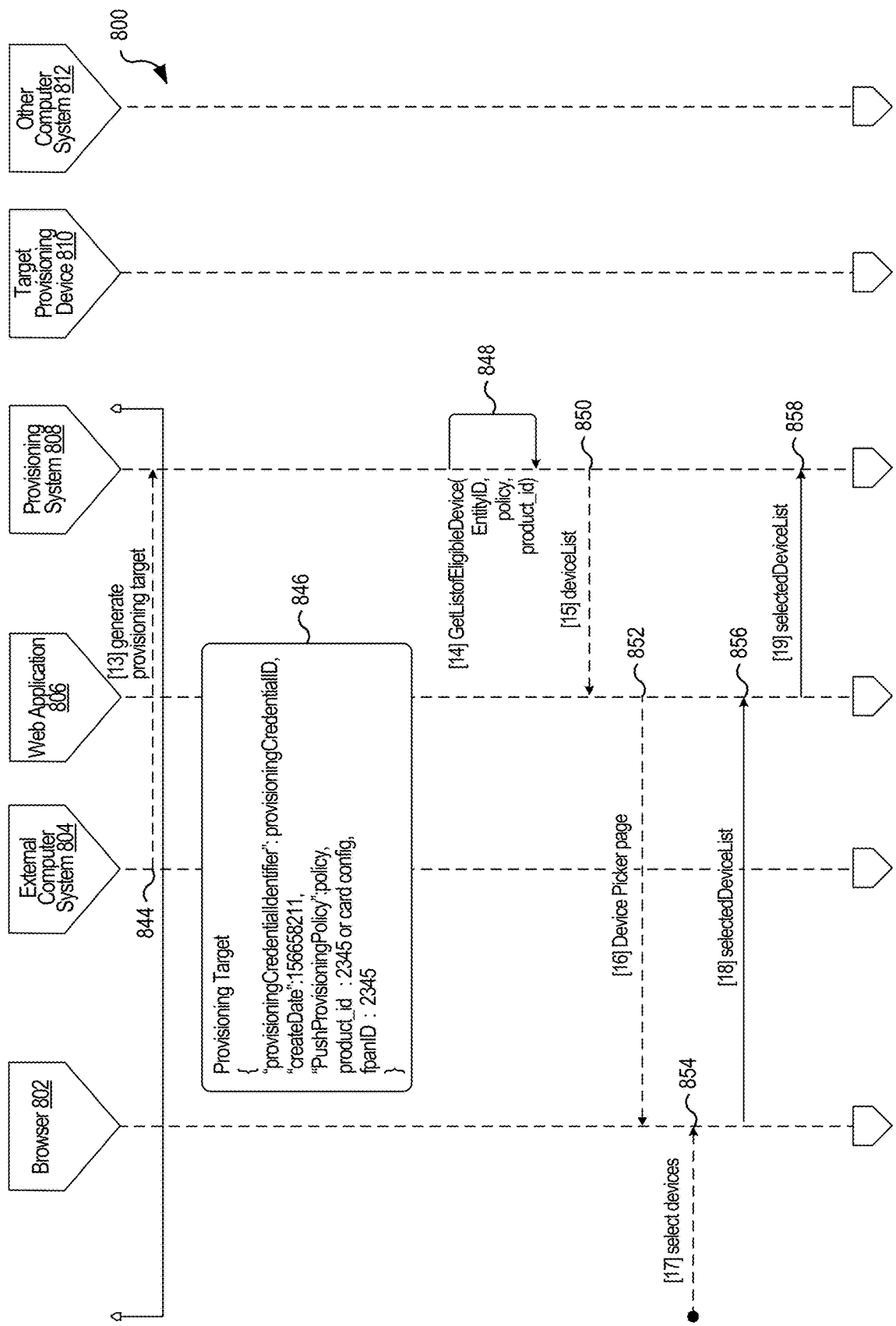

Turning now to FIG. 8C, at 844, the external computer system 804 generates the provisioning target package 846. In some examples, at 844, the external computer system 804 may also share the provisioning target package 846 with the provisioning system 808. At 848, the provisioning system 808 generates a list of eligible devices, using the entity ID, policy, and product ID. In some examples, the list of eligible devices includes devices capable of receiving the credential. The devices may be associated with the account of the user who initiated the process depicted by the sequence diagram 800, or may be associated with accounts of other users. At 850, the provisioning system 808 sends a device list with the web application 806. Using this information, the web application 806, at 852, provides a device picker page at the browser 802. The device picker page enables the user to select which devices from the device list should receive the credential. Thus, at 854, the user selects one or more devices from the device picker page presented at the browser 802. At 856, the selected devices are shared with the web application 806 and, at 858, the web application 806 shares the selected devices with the provisioning system 808.

Figure 8D:
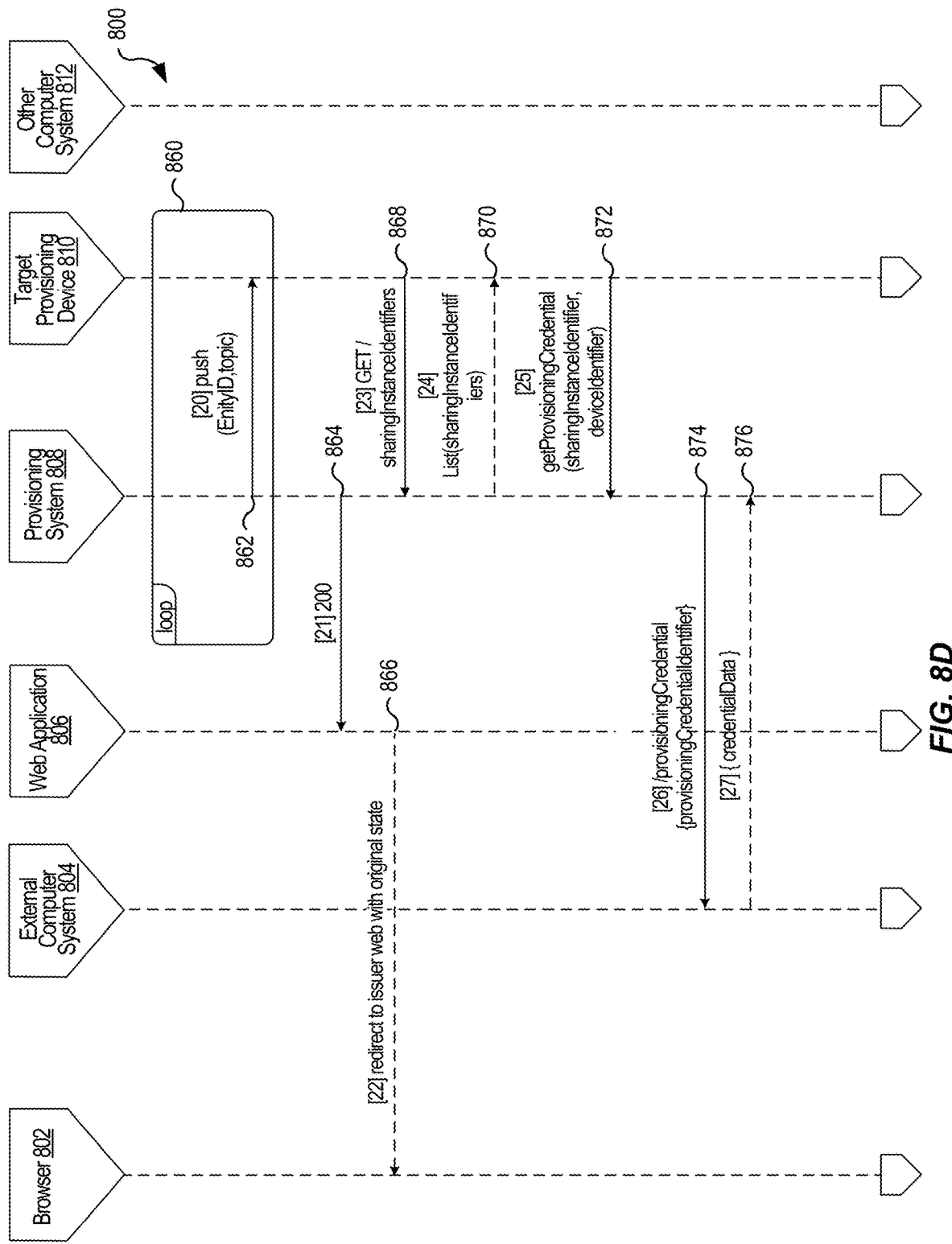
Figure 8E:
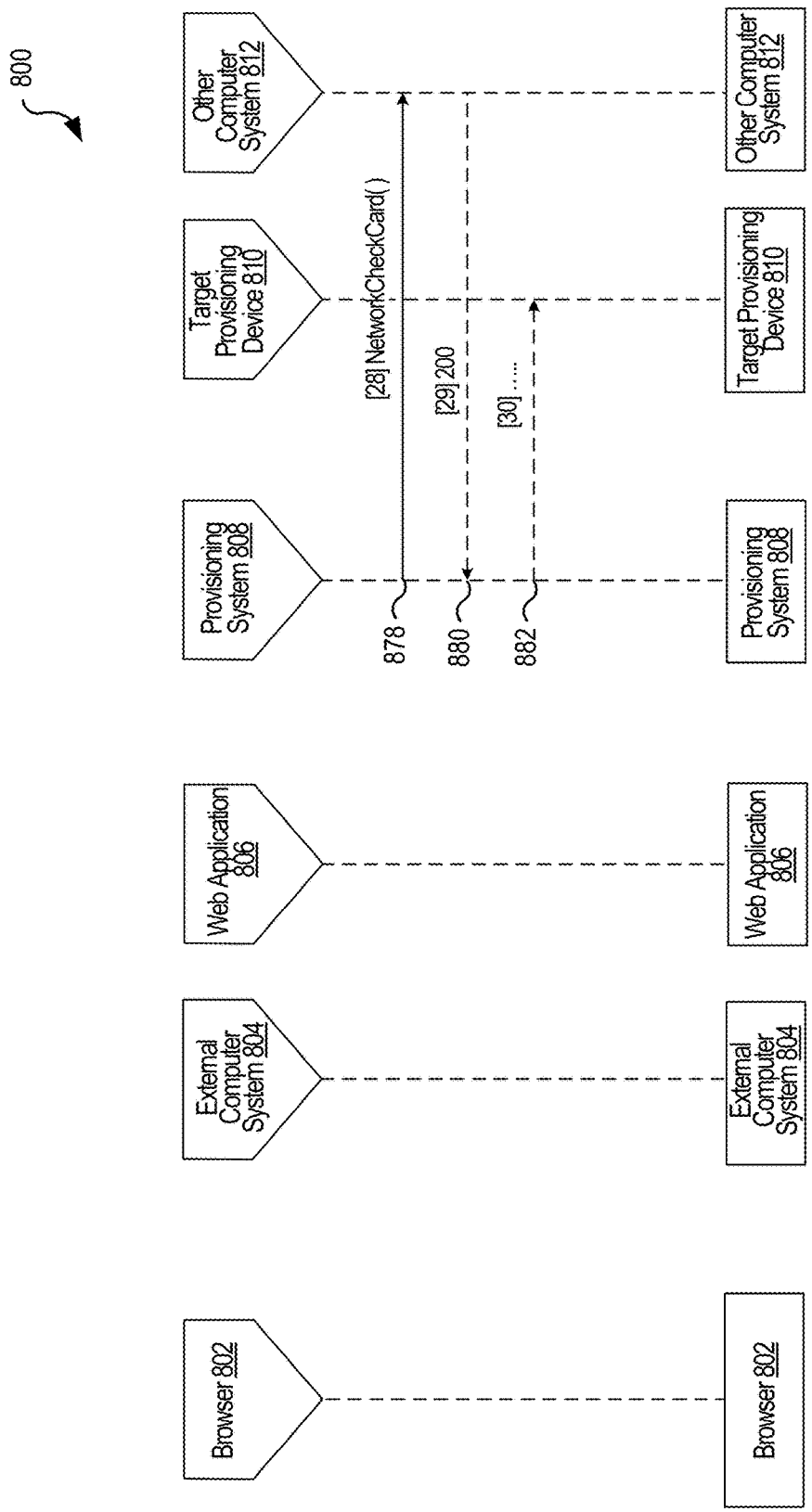

Turning now to FIG. 8D, FIG. 8D depicts loop 860, which includes, at 862, the provisioning system 808 pushing a notification to the target provisioning device 810. The notification may include information representing that a credential is attempted to be provisioned on the target provisioning device 810. At 864, the provisioning system 808 sends a confirmation message to the web application 806. At 866, the web application 806 redirects the browser 802 to the original state, e.g., before the sign-in with entity flow and device selection. For example, this may be a current webpage of the bank or other entity associated with the credential. Steps 868, 870, and 872 may be performed similarly as described with reference to steps 774, 776, and 780. At 868, e.g., responsive to the notification at 862, the target provisioning device 810 requests sharing instance identifiers from the provisioning system 808. In response, at 870, the provisioning system 808 provides a list to the target provisioning device 810 including the sharing instance identifiers. At 872, the target provisioning device 810 performs a new card check eligibility with the provisioning system 808 using the sharing instance identifier and device identifier. At 874, the provisioning system 808 requests the provisioning credential from the external computer system 804 using the provisioning credential identifier, derived from the provisioning target package 846. In response, at 876, the external computer system 804 provides credential data including the credential to the provisioning system 808. At 878, the provisioning system 808 performs a network check of the card associated with the credential by communicating with the other computer system 812. In response, at 880, the other computer system 812 sends a confirmation message to the provisioning system 808. At 882, the provisioning system 808 confirms with the target provisioning device 810 that the credential is available for use.

Figure 9:
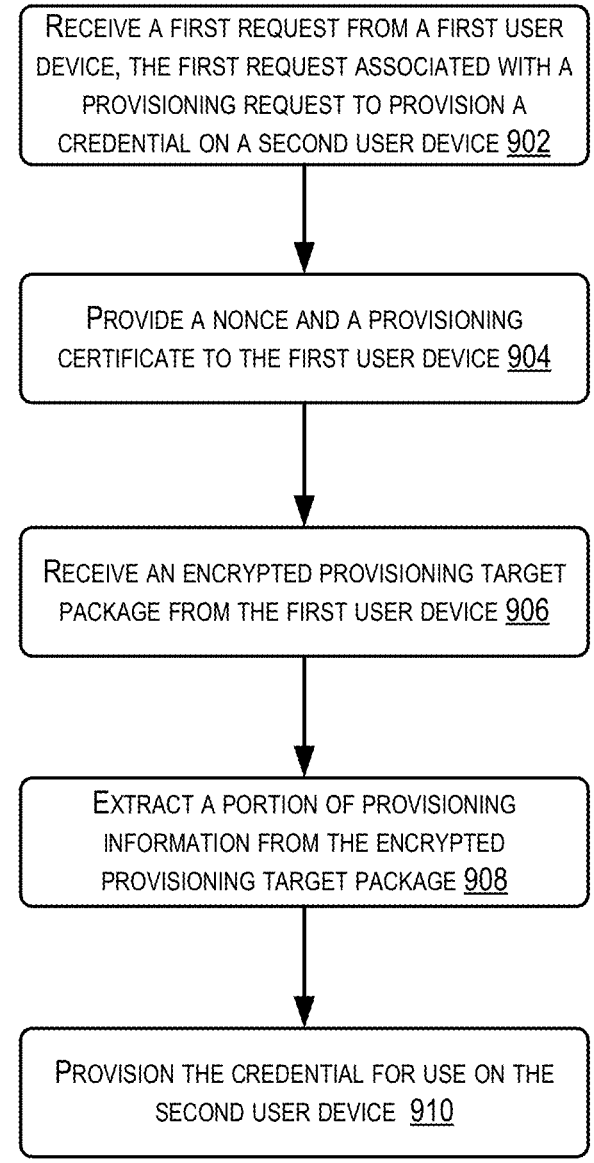
FIG. 9 illustrates a flowchart showing an example process for provisioning a credential for use on a second user device responsive to a request from a first user device, according to at least one example.

FIG. 9 illustrates a flowchart showing an example process 900 for provisioning a credential for use on a second user device responsive to a request from a first user device, according to at least one example. The process 900 may be performed by the service provider 104 and in particular the provisioning system 204 of the service provider 104. The process 900 may relate to an in-application provisioning process such as, for example, described with reference to FIGS. 7A-7D. For example, using the process 900, a user on a first device may cause provisioning of one or more credentials on second devices. The second devices may have shared account information with the first device or may be separate.

The process 900 begins at 902 by the provisioning system 204 (FIG. 2) receiving a first request from a first user device (e.g., a source user device). The first request may be associated with a provisioning request to provision a credential on a second user device (e.g., a target user device). In some examples, a second user account of the second user device is excluded from a set of trusted accounts managed by a user account of the first user device. In some examples, a second user account of the second user device is included in a set of trusted accounts managed by a user account of the first user device.

At 904, the process 900 includes the provisioning system 204 providing a nonce and a provisioning certificate chain to the first user device. The nonce and the provisioning certificate chain may be shared with the first user device responsive to the first request received at 902.

At 906, the process 900 includes the provisioning system 204 receiving an encrypted provisioning target package from the first user device. The encrypted provisioning target package may include the nonce and provisioning information for provisioning the credential for use on the second user device. In some examples, receiving the encrypted provisioning target package may include receiving the encrypted provisioning target package via an instant messaging system (e.g., the messaging system 202) and an associated messaging application on the user device.

At 908, the process 900 includes the provisioning system 204 extracting at least a portion of the provisioning information from the encrypted provisioning target package. In some examples, extracting at least the portion of the provisioning information may include extracting at least one of a provisioning credential identifier, a sharing instance identifier, a user device identifier identifying the second user device, or a user identifier identifying a user account associated with the second user device. In this example, the second request may include at least one of the provisioning credential identifier, the sharing instance identifier, the user device identifier identifying the second user device, or the user identifier identifying the user account associated with the second user device.

In some examples, prior to extracting the provisioning information, the process 900 may include the provisioning system 204 decrypting the encrypted provisioning target package.

At 910, the process 900 includes the provisioning system 204 provisioning the credential for use on the second user device. This may be based at least in part on the portion of the provisioning information extracted at 908. In some examples, the provisioning information may include a provisioning policy. In this example, the provisioning of the credential for use on the second device may be based at least in part on validating the provisioning policy. In some examples, provisioning the credential for use on the second user device may include provisioning without receiving a provisioning request from the second user device. For example, the provisioning on the second user device may be performed automatically and/or without the second user device independently requesting such provisioning from the provisioning system 204.

In some examples, the process 900 may further include the provisioning system 204 sending, to an external computer system (e.g., an issuing system 220 (FIG. 2)), a second request for credential information corresponding to the credential. The second request may include the portion of the provisioning information extracted previously. In this example, provisioning the credential for use on the second user device at 910 may be further based at least in part on the credential information received from the external computer system.

Figure 10:
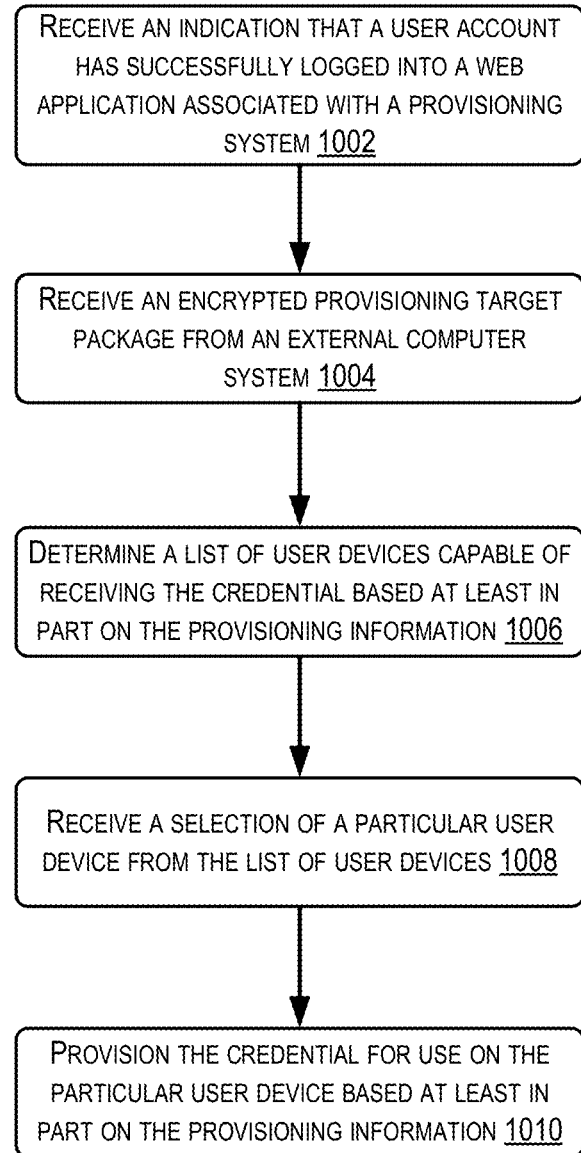
FIG. 10 illustrates a flowchart showing an example process for provisioning a credential for use on a second user device responsive to a request from a first user device, according to at least one example.

FIG. 10 illustrates a flowchart showing an example process 1000 for provisioning a credential for use on a second user device responsive to a request from a first user device, according to at least one example. The process 1000 may be performed by the service provider 104 and in particular the provisioning system 204 of the service provider 104. The process 1000 may relate to a web-based provisioning process such as, for example, described with reference to FIGS. 8A-8E. For example, using the process 1000, a user on a first device may, from a browser using a web application, cause provisioning of one or more credentials on second devices. The second devices may have shared account information with the first device or may be separate.

The process 1000 begins at 1002 by the provisioning system 204 (FIG. 2) receiving an indication that a user account has successfully logged into a web application associated with the provisioning system. In some examples, the web application is hosted by a cloud storage and compute system (e.g., 206) associated with the provisioning system.

At 1004, the process 1000 includes the provisioning system 204 receiving an encrypted provisioning target package from an external computer system. The encrypted provisioning target package may include provisioning information for provisioning a credential for use on a user device associated with the user account. In some examples, the provisioning target package is generated based at least in part on information from the web application obtained when the user account successfully logged into the web application.

At 1006, the process 1000 includes the provisioning system 204 determining a list of user devices capable of receiving the credential based at least in part on the provisioning information. Individual user devices of the list of user devices may be associated with the user account. In some examples, at least one user device of the list of user devices is associated with a different user account.

At 1008, the process 1000 includes the provisioning system 204 receiving a selection of a particular user device from the list of user devices. In some examples, the process 1000 may further include sending the list of devices to the web application. The web application may be configured to provide a device picker webpage at the first user device that includes the list of user devices.

At 1010, the process 1000 includes the provisioning system 204 provisioning the credential for use on the particular user device based at least in part on the provisioning information. In some examples, provisioning the credential for use on the particular user device may include exchanging sharing information (e.g., sharing instance information) with the particular user device, and exchanging credential information with the external computer system.

Figure 11:
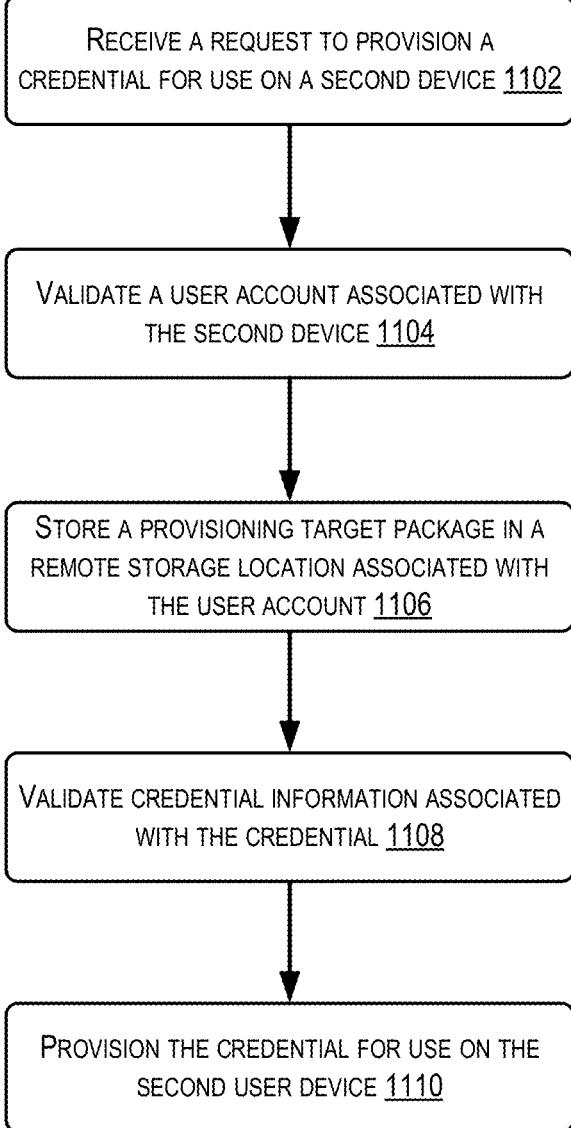
FIG. 11 illustrates a flowchart showing an example process for provisioning a credential for use on a second user device responsive to a request from a first user device, according to at least one example.

FIG. 11 illustrates a flowchart showing an example process 1100 for provisioning a credential for use on a second user device responsive to a request from a first user device, according to at least one example. The process 1100 may be performed by the service provider 104. The process 1100 may relate to an in-application provisioning process such as, for example, described with reference to FIGS. 7A-7D.

The process 1100 begins at 1102 by receiving, via a messaging system 202 (FIG. 2), a request to provision a credential for use on a second device. The request may be received from a first user device. The request may include an encrypted provisioning target package that comprises provisioning information. In some examples, the encrypted provisioning target package is received via a messaging application on the second user device. In some examples, the process 1100 may further include providing a nonce and a provisioning certificate to the first user device. In this example, the first user device may be configured to generate the provisioning target package and use the nonce and/or the provisioning certificate to encrypt the provisioning target package.

At 1104, the process 1100 includes validating, using the messaging system 202, a user account associated with the second device. The validating may be based at least in part on the provisioning information in the encrypted provisioning target package.

At 1106, the process 1100 includes storing, using a cloud storage and compute system 206 (FIG. 2), the provisioning target package in a remote storage location associated with the user account.

At 1108, the process 1100 includes validating, using a provisioning system 204 (FIG. 2), credential information associated with the credential. Validating the credential information may be based at least in part on the provisioning information in the provisioning target package. In some examples, the process 1100 may further include receiving the credential information from the second user device. In this example, the credential information may include the nonce.

At 1110, the process 1100 includes provisioning the credential for use on the second user device based at least in part on validating the credential information. This may be performed by the provisioning system 204 and/or the second user device. In some examples, the user account is associated with the second user device and is included in a set of trusted accounts managed by a user account associated with the first user device. In this example, provisioning the credential for use on the second user device may be performed without receiving user input from the user account of the second user device.

Figure 12:
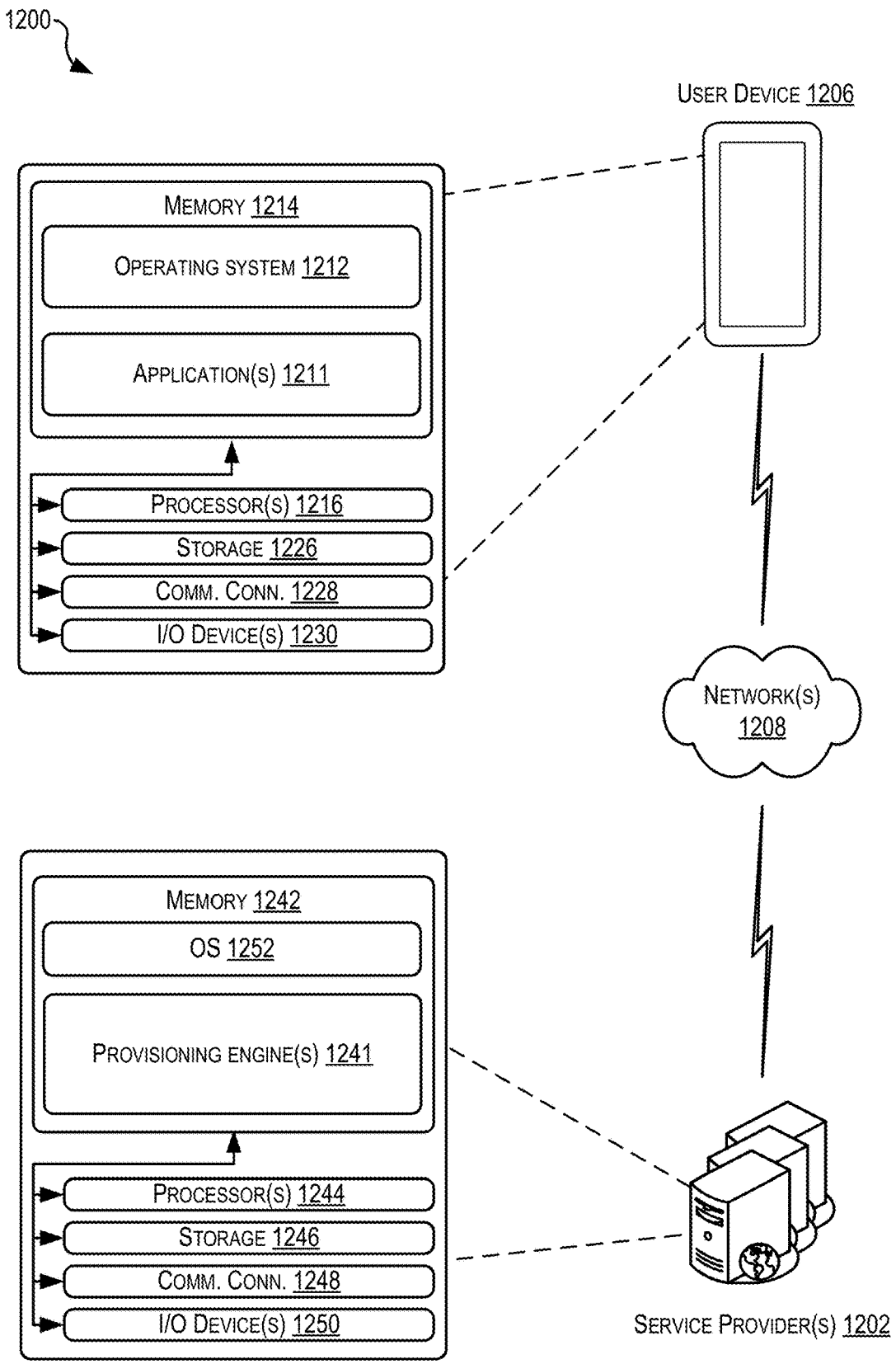
FIG. 12 illustrates a simplified block diagram depicting an example architecture for implementing the techniques described herein, according to at least one example.

FIG. 12 illustrates an example architecture or environment 1200 configured to implement techniques described herein, according to at least one example. In some examples, the example architecture 1200 may further be configured to enable a user device 1206 and service provider computer 1202 to share information. The service provider computer 1202 is an example of the service provider 104, the issuing system 220, and the other computer system 812. The user device 1206 is an example of the user devices 106 and 108. In some examples, the devices may be connected via one or more networks 1208 (e.g., via Bluetooth, WiFi, the Internet, or the like). In some examples, the service provider computer 1202 may be configured to implement at least some of the techniques described herein with reference to the user device 1206.

In some examples, the networks 1208 may include any one or a combination of many different types of networks, such as cable networks, the Internet, wireless networks, cellular networks, satellite networks, other private and/or public networks, or any combination thereof. While the illustrated example represents the user device 1206 accessing the service provider computer 1202 via the networks 1208, the described techniques may equally apply in instances where the user device 1206 interacts with the service provider computer 1202 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer configurations, etc.).

As noted above, the user device 1206 may be any type of computing device such as, but not limited to, a mobile phone, a smartphone, a personal digital assistant (PDA), a laptop computer, a desktop computer, a thin-client device, a tablet computer, a wearable device such as a smart watch, or the like. In some examples, the user device 1206 may be in communication with the service provider computer 1202 via the network 1208, or via other network connections.

In one illustrative configuration, the user device 1206 may include at least one memory 1214 and one or more processing units (or processor(s)) 1216. The processor(s) 1216 may be implemented as appropriate in hardware, computer-executable instructions, firmware, or combinations thereof. Computer-executable instruction or firmware implementations of the processor(s) 1216 may include computer-executable or machine-executable instructions written in any suitable programming language to perform the various functions described. The user device 1206 may also include geo-location devices (e.g., a global positioning system (GPS) device or the like) for providing and/or recording geographic location information associated with the user device 1206.

The memory 1214 may store program instructions that are loadable and executable on the processor(s) 1216, as well as data generated during the execution of these programs. Depending on the configuration and type of the user device 1206, the memory 1214 may be volatile (such as random access memory (RAM)) and/or non-volatile (such as read-only memory (ROM), flash memory, etc.). The user device 1206 may also include additional removable storage and/or non-removable storage 1226 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1214 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 1214 and the additional storage 1226, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 1214 and the additional storage 1226 are both examples of non-transitory computer storage media. Additional types of computer storage media that may be present in the user device 1206 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 1206. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 1206 may also contain communications connection(s) 1228 that allow the user device 1206 to communicate with a data store, another computing device or server, user terminals, and/or other devices via the network 1208. The user device 1206 may also include I/O device(s) 1230, such as a keyboard, a mouse, a pen, a voice input device, a touch screen input device, a display, speakers, a printer, etc.

Turning to the contents of the memory 1214 in more detail, the memory 1214 may include an operating system 1212 and/or one or more application programs or services for implementing the features disclosed herein such as applications 1211 (e.g., digital wallet, third-party applications, browser application, etc.). In some examples, the service provider computer 1202 may also include a health application to perform similar techniques as described with reference to the user device 1206. Similarly, at least some techniques described with reference to the service provider computer 1202 may be performed by the user device 1206.

The service provider computer 1202 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, a virtual machine instance, etc. In some examples, the service provider computer 1202 may be in communication with the user device 1206 via the network 1208, or via other network connections.

In one illustrative configuration, the service provider computer 1202 may include at least one memory 1242 and one or more processing units (or processor(s)) 1244. The processor(s) 1244 may be implemented as appropriate in hardware, computer-executable instructions, firmware, or combinations thereof. Computer-executable instruction or firmware implementations of the processor(s) 1244 may include computer-executable or machine-executable instructions written in any suitable programming language to perform the various functions described.

The memory 1242 may store program instructions that are loadable and executable on the processor(s) 1244, as well as data generated during the execution of these programs. Depending on the configuration and type of service provider computer 1202, the memory 1242 may be volatile (such as RAM) and/or non-volatile (such as ROM, flash memory, etc.). The service provider computer 1202 may also include additional removable storage and/or non-removable storage 1246 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1242 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 1242 and the additional storage 1246, both removable and non-removable, are both additional examples of non-transitory computer-readable storage media.

The service provider computer 1202 may also contain communications connection(s) 1248 that allow the service provider computer 1202 to communicate with a data store, another computing device or server, user terminals and/or other devices via the network 1208. The service provider computer 1202 may also include I/O device(s) 1250, such as a keyboard, a mouse, a pen, a voice input device, a touch input device, a display, speakers, a printer, etc.

Turning to the contents of the memory 1242 in more detail, the memory 1242 may include an operating system 1252 and/or one or more application programs or services for implementing the features disclosed herein including a provisioning engine(s) 1241 (e.g., transport service 210, provisioning service 224, transaction processing service 226, and/or authentication service 230).

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data available from various sources to provide a comprehensive and complete window to a user's personal health record. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to a user's personal health record. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. One or more non-transitory computer-readable media comprising computer-executable instructions that, when executed by one or more processors of a first user device, cause the first user device to perform operations comprising:
responsive to a first selection, at the first user device, of a provisioning target for provisioning a provisioning item, requesting a provisioning certificate from a provisioning system, wherein the provisioning target comprises a second user device;
receiving, from the provisioning system, a nonce and the provisioning certificate;
generating an encrypted provisioning target package using the provisioning certificate and the nonce; and
providing the encrypted provisioning target package to enable provisioning of the provisioning item on the provisioning target.

2. The one or more non-transitory computer-readable media of claim 1, wherein the provisioning item comprises a credential associated with at least one of a pass, a ticket, or a credit card.

3. The one or more non-transitory computer-readable media of claim 1, wherein the provisioning certificate comprises an encryption key, and wherein generating the encrypted provisioning target package comprises encrypting a provisioning target package using the encryption key and the nonce.

4. The one or more non-transitory computer-readable media of claim 1, wherein the computer-executable instructions further cause the one or more processors to perform operations comprising determining that a first user account associated with the first user device is within a trusted circle with a second user account associated with the second user device.

5. The one or more non-transitory computer-readable media of claim 4, wherein providing the encrypted provisioning target package comprises providing the encrypted provisioning target package to the second user device, the second user device configured to provide the encrypted provisioning target package to the provisioning system to enable the provisioning system to provision the provisioning item on the second user device.

6. The one or more non-transitory computer-readable media of claim 1, wherein the computer-executable instructions further cause the one or more processors to perform operations comprising determining that a first user account associated with the first user device and a second user account associated with the second user device are not within a trusted circle.

7. The one or more non-transitory computer-readable media of claim 6, wherein providing the encrypted provisioning target package comprises providing the encrypted provisioning target package to the provisioning system to enable the provisioning system to provision the provisioning item on the second user device.

8. The one or more non-transitory computer-readable media of claim 7, wherein providing the encrypted provisioning target package to the provisioning system comprises providing the encrypted provisioning target package without sending the encrypted provisioning target package to the second user device.

9. The one or more non-transitory computer-readable media of claim 1, wherein the computer-executable instructions further cause the one or more processors to perform operations comprising, prior to requesting the provisioning certificate:
responsive to a second user selection of the provisioning item at the first user device, requesting provisioning information;
receiving the provisioning information comprising a credential identifier and a sharing instance identifier; and
providing a sharing view user interface for presentation at the first user device based on the provisioning information.

10. The one or more non-transitory computer-readable media of claim 9, wherein the first selection is registered at the sharing view user interface.

11. A user device, comprising:
a memory comprising computer-executable instructions; and
a processor configured to access the memory and execute the computer-executable instructions to at least:
responsive to a first selection of a provisioning target for provisioning a provisioning item, request a provisioning certificate from a provisioning system, wherein the provisioning target comprises a second user device;
receive, from the provisioning system, a nonce and the provisioning certificate;
generate an encrypted provisioning target package using the provisioning certificate and the nonce; and
provide the encrypted provisioning target package to enable provisioning of the provisioning item on the provisioning target.

12. The user device of claim 11, wherein the provisioning item comprises a credential associated with at least one of a pass, a ticket, or a credit card.

13. The user device of claim 11, wherein the provisioning certificate comprises an encryption key, and wherein generating the encrypted provisioning target package comprises encrypting a provisioning target package using the encryption key and the nonce.

14. The user device of claim 11, wherein the user device comprises a first user device, and wherein the processor is further configured to access the memory and execute the computer-executable instructions to at least determine that a first user account associated with the first user device is within a trusted circle with a second user account associated with a second user device.

15. The user device of claim 14, wherein providing the encrypted provisioning target package comprises providing the encrypted provisioning target package to the second user device, the second user device configured to provide the encrypted provisioning target package to the provisioning system to enable the provisioning system to provision the provisioning item on the second user device.

16. A computer-implemented method, comprising:
responsive to a first selection, at a first user device, of a provisioning target for provisioning a provisioning item, requesting a provisioning certificate from a provisioning system, wherein the provisioning target comprises a second user device;
receiving, from the provisioning system, a nonce and the provisioning certificate;
generating an encrypted provisioning target package using the provisioning certificate and the nonce; and
providing the encrypted provisioning target package to enable provisioning of the provisioning item on the provisioning target.

17. The computer-implemented method of claim 16, wherein the method further comprises, prior to requesting the provisioning certificate:
responsive to a second user selection of the provisioning item at the first user device, requesting provisioning information;
receiving the provisioning information comprising a credential identifier and a sharing instance identifier; and
providing a sharing view user interface for presentation at the first user device based on the provisioning information.

18. The computer-implemented method of claim 17, wherein the first selection is registered at the sharing view user interface.

19. The computer-implemented method of claim 16, wherein the provisioning item comprises a credential associated with at least one of a pass, a ticket, or a credit card.

20. The computer-implemented method of claim 16, wherein the method further comprises determining that a first user account associated with the first user device is within a trusted circle with a second user account associated with the second user device.

* * * * *